(12) United States Patent
Case

(10) Patent No.: US 6,859,785 B2
(45) Date of Patent: Feb. 22, 2005

(54) DIAGNOSTIC METHOD AND APPARATUS FOR BUSINESS GROWTH STRATEGY

(75) Inventor: Amy Case, North Hampton, NH (US)

(73) Assignee: Case Strategy LLP, Portsmouth, NH (US)

( * ) Notice: Subject to any disclaimer, the term of this patent is extended or adjusted under 35 U.S.C. 154(b) by 891 days.

(21) Appl. No.: 09/758,646

(22) Filed: Jan. 11, 2001

(65) Prior Publication Data

US 2002/0173998 A1 Nov. 21, 2002

(51) Int. Cl.⁷ .............................................. G06F 17/60
(52) U.S. Cl. ............................. 705/10; 705/7; 705/36; 705/38
(58) Field of Search ............................. 705/7, 10, 36, 705/38

(56) References Cited

U.S. PATENT DOCUMENTS

| | | | | |
|---|---|---|---|---|
| 5,812,988 A | * | 9/1998 | Sandretto ...................... | 705/36 |
| 5,875,431 A | * | 2/1999 | Heckman et al. .............. | 705/7 |
| 6,321,205 B1 | * | 11/2001 | Eder ............................. | 705/7 |
| 6,578,009 B1 | * | 6/2003 | Shinozaki ..................... | 705/10 |
| 6,708,155 B1 | * | 3/2004 | Honarvar et al. .............. | 705/7 |

OTHER PUBLICATIONS

Porter, M.E., *Competitive Strategy*, (NY: The Free Press) 1980.

Blazey, M.L., "Insights to Performance Excellence 2001: An Inside Look at the 2001 Baldrige Award Criteria," (downloaded from Internet May 16, 2001).

Kaplan, R.S. and D.P. Norton, *The Balanced Scorecard: Translating Strategy into Action*, (Boston: Harvard Business School Publishing) 1996.

Zook, C., *Profit from the Core—Growth Strategy in an Era of Turbulence*, (Boston: Harvard Business School Press) 2001.

"The Growth–Share Matrix," (downloaded from the Internet Apr. 19, 2001) 2 pp.

"The Experience Curve," (downloaded from the Internet Apr. 19, 2001) 7 pp.

"Bennett Stewart explains how EVA®. . . " 1999, 2 pp.

\* cited by examiner

*Primary Examiner*—Romain Jeanty
(74) *Attorney, Agent, or Firm*—Hamilton, Brook, Smith & Reynolds, P.C.

(57) ABSTRACT

A method and apparatus for quantitatively determining the optimal mix of strategies to drive growth (i.e., in company profits). The growth strategy mix includes a reenergize component, an adjacency component and a transformation component. Company data of companies exhibiting successful growth is obtained. From the obtained company data, a model that quantifies respective amounts of reenergizing activities, adjacency activities and transformation activities for different strategic growth mixes is defined. The model is applied to a given company such that respective quantitative amounts of a reenergize component, an adjacency component and a transformation component are defined and form a strategic growth mix for the given company. The invention may be computer implemented to provide an interactive questionnaire for quantitatively determining a growth strategy mix. A non-electronic questionnaire implementation provides a calculation tool of the present invention as well.

11 Claims, 24 Drawing Sheets

SAMPLE FROM SETTINGS

| Scoring | | 1. Reenerg | 2. Adj | 3. Trans. |
|---|---|---|---|---|
| ABS DIFF 12.7735% | | | | |
| Correl 0.6388 | | Score | Score | Score |
| I. Prediction | | | | |
| A. Key Business Parameters | | | | |
|   1. Mkt Share/Revenue Ratio | | 100.00 | 100.00 | 100.00 |
|   2. Asset Intensity (Asset/Rev Ratio) | | 25.00 | 25.00 | 25.00 |
|   3. Change in Profitability | | 100.00 | 100.00 | 100.00 |
| B. Funding Strategy / Risk | | | | |
|   1. Company Beta | | 100.00 | 100.00 | 100.00 |
|   2. Debt/Equity Ratio | | 125.00 | 125.00 | 125.00 |
|   3. Creditworthiness | | 25.00 | 25.00 | 25.00 |
|   4. Cash Flow/Revenue Ratio | | 25.00 | 25.00 | 25.00 |
| C. Market | | | | |
|   1. Relative Market Share | | 200.00 | 200.00 | 200.00 |
|   2. Change in Market Share | | 150.00 | 150.00 | 150.00 |
|   3. Relative Elasticity of Demand | | 0.00 | 0.00 | 0.00 |
| II. Actual | | | | |
| A. Business Structure | | | | |
|   1. Business Mix | | 0.00 | 75.00 | |
|   2. Business Age | | 0.00 | 0.00 | 100.00 |
|   3. Number of Divisions | | 25.00 | 25.00 | |
|   4. Number of SIC Industries | | 25.00 | 25.00 | |
| B. Business Strategy | | | | |
|   1. R&D Investment | | 0.00 | 0.00 | 100.00 |
|   2. Acquisition Strategy | | 112.50 | 75.00 | 112.50 |
|   3. Strategic Intent | | 75.00 | 150.00 | 150.00 |

Intervals

ABS DIFF 12.7735%
CORREL 0.6388

| | 1. Reenerg. | 2. Adj. | 3. Trans. | Threshold Type |
|---|---|---|---|---|
| | Interval | Interval | Interval | |
| I. Prediction | | | | |
| A. Key Business Parameters | | | | |
| 1. Mkt Share/Revenue Ratio | Low | Medium | High | Percentile |
| 2. Asset Intensity (Asset/Rev Ratio) | High | Medium | Low | Percentile |
| 3. Change in Profitability | Zero | Incr. | Decl. | Percentile |
| B. Funding Strategy / Risk | | | | |
| 1. Company Beta | Low | Medium | High | Percentile |
| 2. Debt/Equity Ratio | High | Medium | Low | Percentile |
| 3. Creditworthiness | Low | High | Medium | Percentile |
| 4. Cash Flow/Revenue Ratio | Low | High | Medium | Percentile |
| C. Market | | | | |
| 1. Relative Market Share | Medium | High | Low | Percentile |
| 2. Change in Market Share | Zero | Incr. | Decl. | Percentile |
| 3. Relative Elasticity of Demand | High | Medium | Low | Percentile |
| II. Actual | | | | |
| A. Business Structure | | | | |
| 1. Business Mix | Low | High | N/A | Percentile |
| 2. Business Age | High | High | Low | Fixed |
| 3. Number of Divisions | Low | High | N/A | Percentile |
| 4. Number of SIC Industries | Low | High | N/A | Percentile |
| B. Business Strategy | | | | |
| 1. R&D Investment | Low | Low | High | Percentile |
| 2. Acquisition Strategy | N/A | N/A | N/A | N/A |
| 3. Strategic Intent | N/A | N/A | N/A | N/A |
| List of Arguments For This Table | Low | Medium | High | Percentile |
| | Decl. | Zero | Incr. | Fixed |
| | N/A | N/A | N/A | N/A |

FIG. 5A

| | Conversion | | | Do Not Change | | | | |
|---|---|---|---|---|---|---|---|---|
| | | | | 1. Reenerg. | 2. Adj. | 3. Trans. | Threshold | |
| | | | | Interval | Interval | Interval | Type | |
| I. Prediction | | | | | | | | |
| A. Key Business Parameters | | | | | | | | |
| 1. Mkt Share/Revenue Ratio | | | | 1 | 2 | 3 | 1 | |
| 2. Asset Intensity (Asset/Rev Ratio) | | | | 3 | 2 | 1 | 1 | |
| 3. Change in Profitability | | | | 2 | 3 | 1 | 1 | |
| B. Funding Strategy / Risk | | | | | | | | |
| 1. Company Beta | | | | 1 | 2 | 3 | 1 | |
| 2. Debt/Equity Ratio | | | | 3 | 2 | 1 | 1 | |
| 3. Creditworthiness | | | | 1 | 3 | 2 | 1 | |
| 4. Cash Flow/Revenue Ratio | | | | 1 | 3 | 2 | 1 | |
| C. Market | | | | | | | | |
| 1. Relative Market Share | | | | 2 | 3 | 1 | 1 | |
| 2. Change in Market Share | | | | 2 | 3 | 1 | 1 | |
| 3. Relative Elasticity of Demand | | | | 3 | 2 | 1 | 1 | |
| II. Actual | | | | | | | | |
| A. Business Structure | | | | | | | | |
| 1. Business Mix | | | | 1 | 3 | 9 | 1 | |
| 2. Business Age | | | | 3 | 3 | 1 | 2 | |
| 3. Number of Divisions | | | | 1 | 3 | 9 | 1 | |
| 4. Number of SIC Industries | | | | 1 | 3 | 9 | 1 | |
| B. Business Strategy | | | | | | | | |
| 1. R&D Investment | | | | 1 | 1 | 3 | 1 | |
| 2. Acquisition Strategy | | | | 9 | 9 | 9 | 9 | |
| 3. Strategic Intent | | | | 9 | 9 | 9 | 9 | |

FIG. 5B

| | A | B | C | D | E | F | G | H |
|---|---|---|---|---|---|---|---|---|
| 1 | General Arguements | | Arguements for Prediction | | Arguements for Actual | | Arguements for Threshold | |
| 2 | | | | | | | | |
| 3 | | | | | | | | |
| 4 | Bottom | 1 | Decl. | 1 | Decl. | 1 | Fixed | 2 |
| 5 | Extra | 4 | High | 3 | High | 3 | N/A | 9 |
| 6 | Middle | 2 | Incr. | 3 | Incr. | 3 | Percentile | 1 |
| 7 | N/A | 9 | Low | 1 | Low | 1 | | |
| 8 | Top | 3 | Medium | 2 | N/A | 9 | | |
| 9 | | | Zero | 2 | | | | |
| 10 | | | | | | | | |
| 11 | | | | | | | | |
| 12 | If any of these arguements change, each list has to be sorted alphabetically by name in ascending order. | | | | | | | |
| 13 | | | | | | | | |
| 14 | | | | | | | | |
| 15 | | | | | | | | |

SAMPLE FROM SETTINGS

Scoring

ABS DIFF 12.7735%
Correl 0.6388

| | | 1. Reenerg Score | 2. Adj Score | 3. Trans. Score |
|---|---|---|---|---|
| I. Prediction | | | | |
| A. Key Business Parameters: | | | | |
| 1. Mkt Share/Revenue Ratio | | 100.00 | 100.00 | 100.00 |
| 2. Asset Intensity (Asset/Rev Ratio) | | 25.00 | 25.00 | 25.00 |
| 3. Change in Profitability | | 100.00 | 100.00 | 100.00 |
| B. Funding Strategy / Risk | | | | |
| 1. Company Beta | | 100.00 | 100.00 | 100.00 |
| 2. Debt/Equity Ratio | | 125.00 | 125.00 | 125.00 |
| 3. Creditworthiness | | 25.00 | 25.00 | 25.00 |
| 4. Cash Flow/Revenue Ratio | | 25.00 | 25.00 | 25.00 |
| C. Market | | | | |
| 1. Relative Market Share | | 200.00 | 200.00 | 200.00 |
| 2. Change in Market Share | | 150.00 | 150.00 | 150.00 |
| 3. Relative Elasticity of Demand | | 0.00 | 0.00 | 0.00 |
| II. Actual | | | | |
| A. Business Structure | | | | |
| 1. Business Mix | | 0.00 | 75.00 | |
| 2. Business Age | | 0.00 | 0.00 | |
| 3. Number of Divisions | | 25.00 | 25.00 | 100.00 |
| 4. Number of SIC Industries | | 25.00 | 25.00 | |
| B. Business Strategy | | | | |
| 1. R&D Investment | | 0.00 | 0.00 | 100.00 |
| 2. Acquisition Strategy | | 112.50 | 75.00 | 112.50 |
| 3. Strategic Intent | | 75.00 | 150.00 | 150.00 |

FIG. 5D

Thresholds

ABS DIFF 12.7735%
CORREL 0.6388

1. Bottom Threshold  2. Middle Threshold  3. Top Threshold

| | Fixed | Fixed | Fixed |
|---|---|---|---|
| | 4.00% | | 6.00% |

I. Prediction
  A. Key Business Parameters
    1. Mkt Share/Revenue Ratio
    2. Asset Intensity (Asset/Rev Ratio)
    3. Change in Profitability
  B. Funding Strategy / Risk
    1. Company Beta
    2. Debt/Equity Ratio
    3. Creditworthiness
    4. Cash Flow/Revenue Ratio
  C. Market
    1. Relative Market Share
    2. Change in Market Share
    3. Relative Elasticity of Demand II. Actual
  A. Business Structure
    1. Business Mix
    2. Business Age
    3. Number of Divisions
    4. Number of SIC Industries
  B. Business Strategy
    1. R&D Investment
    2. Acquisition Strategy
    3. Strategic Intent

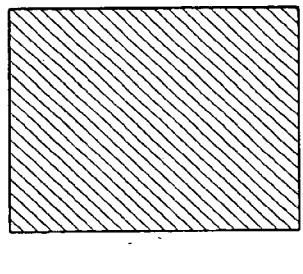
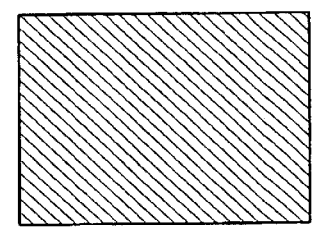

Factors & Strategies

I. Prediction
  A. Key Business Parameters
    1. Mkt Share/Revenue Ratio
    2. Asset Intensity (Asset/Rev Ratio)
    3. Change in Profitability
  B. Funding Strategy / Risk
    1. Company Beta
    2. Debt/Equity Ratio
    3. Creditworthiness
    4. Cash Flow/Revenue Ratio
  C. Market
    1. Relative Market Share
    2. Change in Market Share
    3. Relative Elasticity of Demand II. Actual
  A. Business Structure
    1. Business Mix
    2. Business Age
    3. Number of Divisions
    4. Number of SIC Industries
  B. Business Strategy
    1. R&D Investment
    2. Acquisition Strategy
    3. Strategic Intent 1. Reenerg.   2. Adj.   3. Trans.

FIG. 5G

SAMPLE WORKSHEET FROM "DATABASE" WORKBOOK

| | Value | Interval | ABS DIFF | | | |
|---|---|---|---|---|---|---|
| 3 Com Corporation | | 1 Fortune Fastest Growth (5 yrs) | 21.83% | | Analyze | yes |
| | | | DB 4 | | | |
| | | | 1. Reenerg. | 2. Adj. | 3. Trans. | |
| I. Prediction — DB 2 | | | | | | |
| A. Key Business Parameters | | | | 29 | | |
| 1. Mkt Share/Revenue Ratio | -455.14% | Low | 100 | | | |
| 2. Asset Intensity (Asset/Rev Ratio) | 0.78 | Low | | | 25 | |
| 3. Change in Profitability | -0.010 | Decl. | | | 100 | |
| B. Funding Strategy / Risk | | | | | | |
| 1. Company Beta | 0.01 | N/A | | | | |
| 2. Debt/Equity Ratio | 1.50 | Low | | | | |
| 3. Creditworthiness | 0.20 | High | | 25 | 125 | |
| 4. Cash Flow/Revenue Ratio | | High | | 25 | | |
| C. Market | | | | | | |
| 1. Relative Market Share | 0.34 | Medium | 200 | | | |
| 2. Change in Market Share | -29.54% | Decl. | | | 150 | |
| 3. Relative Elasticity of Demand | 3.00 | Medium | | | | |
| Growth Strategy | | | 40.00% | 6.67% | 53.33% | 100.00% |
| | | | 300 | 50 | 400 | 750 |
| II. Actual — DB 3 | Value | Interval | 1.Reenerg. | 2. Adj. | 3. Trans | |
| A. Business Structure | | | | | | |
| 1. Business Mix | 102.45% | High | | 75 | | |
| 2. Business Age | 21.00 | High | | | | |
| 3. Number of Divisions | 4.00 | High | | 25 | | |
| 4. Number of SIC Industries | 2.00 | Low | 25 | | | |
| B. Business Strategy | | | | | | |
| 1. R&D Investment | 11.01% | High | | | 100 | |
| 2. Acquisition Strategy | | | 25 | 38 | 56.25 | |
| 3. Strategic Intent | | | | 38 | 63 | |
| Growth Strategy | | | 11.20% | 39.41% | 49.38% | 100.00% |
| | | | 50 | 175 | 219.25 | 444 |

FIG. 6A

SAMPLE WORKSHEET FROM "DATABASE" WORKBOOK

| | DB 1 | | |
|---|---|---|---|

III. Data

| | | | | | | |
|---|---|---|---|---|---|---|
| Latest Year Data Available | 1999 | | Number of Years Data Available | 3.00 | Year Business Founded (4 digit) | 1979 |
| 1999 Revenues (in mil) | 5722.15 | | 1999 Net Income (in mil) | 403.87 | Number of Business Divisions | 4.00 |
| 1998 Revenues (in mil) | 5420.37 | | 1998 Net Income (in mil) | 30.21 | 1999 R&D Allocation (in mil) | 635.79 |
| 1997 Revenues (in mil) | 5608.08 | | 1997 Net Income (in mil) | 500.53 | | |
| 1996 Revenues (in mil) | | | 1996 Net Income (in mil) | | Acq. Strategy: 1. Reenerg. | 0.00% |
| | | | | | 43 → 2. Adj. | 50.00% |
| 1999 Assets (in mil) | 4495.39 | | 1999 Market Share (%) | 2.29% | 3. Trans. | 50.00% |
| 1998 Assets (in mil) | 4080.52 | | 1998 Market Share (%) | 3.25% | Total | 100.00% |
| 1999 Debt Outstanding (in mil) | 45.00 | | 1999 Largest Player's Revenue | 16,738.00 | | |
| 1999 Shareholder's Equity (in mil) | 3196.46 | | | | Strategic Intent: 1. Reenerg. | 33.00% |
| 1999 Liabilities (w/o Debt) | 1160.58 | | Number of SIC Industries Involved | 2.00 | 47 → 2. Adj. | 25.00% |
| 1999 Net Cash from Oper. Activ. | 1161.08 | | Elasticity Sum of All Industries | 6.00 | 3. Trans. | 42.00% |
| 1999 Cash at End of Year (in mil) | 952.25 | | Company Beta Hard | | Total | 100.00% |
| 1999 Interest Paid | 4.14 | | Company Beta Switch | | | |

Business Mix

| | | 1998 | | | | 1999 | | | % Change in Share | |
|---|---|---|---|---|---|---|---|---|---|---|
| Geography Region | Revenues | % Share | Assets | % Share | Revenues | % Share | Assets | % Share | Revenues | Assets |
| Region1 | 2962.76 | 54.66% | 602.39 | 14.76% | 3083.95 | 53.43% | 596.33 | 13.27% | -2.25% | -10.14% |
| Region2 | 388.85 | 7.17% | 88.12 | 2.16% | 442.91 | 7.67% | 84.88 | 1.89% | 6.96% | -12.57% |
| Region3 | 2068.76 | 38.17% | 168.28 | 4.12% | 2245.29 | 38.90% | 150.35 | 3.34% | 1.92% | -18.90% |
| Region4 | | 0.00% | | 0.00% | | 0.00% | | 0.00% | N/A | N/A |
| Region5 | | 0.00% | | 0.00% | | 0.00% | | 0.00% | N/A | N/A |
| Region6 | | 0.00% | | 0.00% | | 0.00% | | 0.00% | N/A | N/A |

Business Segment

| | | | | | | | | | | |
|---|---|---|---|---|---|---|---|---|---|---|
| Segment1 | 2347.08 | 43.30% | | 0.00% | 2612.59 | 45.26% | | 0.00% | 4.53% | N/A |
| Segment2 | 2808.94 | 51.82% | | 0.00% | 2589.66 | 44.86% | | 0.00% | -13.43% | N/A |
| Segment3 | 264.35 | 4.88% | | 0.00% | 569.90 | 9.87% | | 0.00% | 102.45% | N/A |
| Segment4 | | 0.00% | | 0.00% | | 0.00% | | 0.00% | N/A | N/A |
| Segment5 | | 0.00% | | 0.00% | | 0.00% | | 0.00% | N/A | N/A |
| Segment6 | | 0.00% | | 0.00% | | 0.00% | | 0.00% | N/A | N/A |
| Segment7 | | 0.00% | | 0.00% | | 0.00% | | 0.00% | N/A | N/A |
| Segment8 | | 0.00% | | 0.00% | | 0.00% | | 0.00% | N/A | N/A |
| Segment9 | | 0.00% | | 0.00% | | 0.00% | | 0.00% | N/A | N/A |
| Segment10 | | 0.00% | | 0.00% | | 0.00% | | 0.00% | N/A | N/A |

FIG. 6B

SAMPLE FROM CALCULATIONS

| | A | B | C | D | E | F | G | H | I | J | K | L |
|---|---|---|---|---|---|---|---|---|---|---|---|---|
| 1 | | | | | | | | | | | | |
| 2 | 1. Mkt Share/Revenue Ratio | | | | | | | | | | | |
| 3 | | | | | 53 | | | | | | | |
| 4 | Factor/Company | | | | Calc 1 | | FALSE | RAVISENT | Neurocrine | FALSE | The Walt netGuru, Inc. | |
| 5 | A. Key Business Parameters | | | | | 57 | FALSE | | | FALSE | | |
| 6 | 1. Mkt Share/Revenue Ratio | | | | | | | -1975.11% | -1054.61% | | -858.22% | -786.75% |
| 7 | | | | | Calc 2 | | | | | | | |
| 8 | Interval | | | | 55 | | N/A | Low | Low | N/A | Low | Low |
| 9 | | | | | | | | | | | | |
| 10 | | | | | | | | | Analysis: | | | |
| 11 | Strategy | Interval | | Type | | From => | To < | | Mean | -62.41% | Sample Size | 85.00 |
| 12 | 29 | | | | | | | | Minimum | -1975.11% | Median | 0.00% |
| 13 | 1. Reenerg. | Low | | Percentile | | NEG INF | -3.43% | | SD | 3.25 | Maximum | 1286.53% |
| 14 | 2. Adj. | Medium | | Percentile | | -3.43% | 50.45% | | | | Variance | 10.57 |
| 15 | 3. Trans. | High | | Percentile 61 | | 50.45% | POS INF | 59 | | | | |
| 16 | | | | | | | | | | | | |
| 17 | | | | | | | | | | | | |
| 18 | | | | | | | | | | | | |
| 19 | 100.00% | | | | | | | | | | | |
| 20 | | | | | | | | | | | | |
| 21 | -400.00% | | | | | | | | | | | |
| 22 | | | | | | | | | | | | |
| 23 | -900.00% | | | | | | | | | | | |
| 24 | | | | | | | | | | | | |
| 25 | -1400.00% | | | | | | | | | | | |
| 26 | | | | | | | | | | | | |
| 27 | -1900.00% | | | | | | | | | | | |
| 28 | | | | | | | | | | | | |
| 29 | -2400.00% | | | | | | | | | | | |
| 30 | | | | | Company | | | | | | | |

SAMPLE FROM CALCULATIONS

| | All Factors | | | 3 Com Corporation | | Adams Resources & Energy, Inc. | | Alcoa | |
|---|---|---|---|---|---|---|---|---|---|
| | | | | Analyze Value | Yes Interval | Analyze Value | Yes Interval | Analyze Value | Yes Interval |
| I. Prediction | | | | | | | | | |
| A. Key Business Parameters | | | | | | | | | |
| 1. Mkt Share/Revenue Ratio | | | | -455.14% | Low | 20.47% | Medium | 21.96% | Medium |
| 2. Asset Intensity (Asset/Rev Ratio) | | | | 0.78 | Low | 0.07 | Low | 1.05 | Low |
| 3. Change in Profitability | | | | -0.97% | Decl. | -0.07% | Zero | 0.84% | Incr. |
| B. Funding Strategy / Risk | | | | | | | | | |
| 1. Company Beta | | | | | N/A | | N/A | | N/A |
| 2. Debt/Equity Ratio | | | | 0.01 | Low | 0.27 | Medium | 0.49 | Medium |
| 3. Creditworthiness | | | | 1.50 | High | 0.03 | Low | 2.60 | High |
| 4. Cash Flow/Revenue Ratio | | | | 0.20 | High | 0.00 | Low | 0.14 | Medium |
| C. Market | | | | | | | | | |
| 1. Relative Market Share | | | | 0.34 | Medium | 0.28 | Medium | 2.23 | High |
| 2. Change in Market Share | | | | -29.54% | Decl | 20.96% | Incr. | 1.41% | Zero |
| 3. Relative Elasticity of Demand | | | | 3.00 | Medium | 2.67 | Low | 3.00 | Medium |
| II. Actual | | | | | | | | | |
| A. Business Structure | | | | | | | | | |
| 1. Business Mix | | | | 102.45% | High | 17.15% | Low | 13.04% | Low |
| 2. Business Age | | | | 21.00 | High | 53.00 | High | 93.00 | High |
| 3. Number of Divisions | | | | 4.00 | High | 3.00 | Low | 6.00 | High |
| 4. Number of SIC Industries | | | | 2.00 | Low | 3.00 | High | 6.00 | High |
| B. Business Strategy | | | | | | | | | |
| 1. R&D Investment | | | | 11.01% | High | 0.00% | Low | 0.78% | Low |

SAMPLE FROM RESULTS

Strategy Table

| Company | Average | 3 Com Corporation | Adams Resources & Energy, Inc. | Alcoa | Allied Waste Industries, Inc. | Amazon.com | America Online Inc. | American Express Company | Ameritrade Holding Corporation | Amsouth Bancorp. | Applied Digital Solutions |
|---|---|---|---|---|---|---|---|---|---|---|---|
| Sheet Number | | 1 | 2 | 3 | 4 | 5 | 6 | 7 | 8 | 9 | 10 |
| Analysis | | yes | yes | yes | yes | yes | yes | yes | yes | no | yes |
| I. Prediction | | | | | | | | | | | |
| 1. Reenerg. | 24.12% | 40.00% | 46.67% | 20.00% | 46.67% | 23.33% | 13.33% | 46.67% | 10.00% | N/A | 6.67% |
| 2. Adj. | 48.16% | 6.67% | 50.00% | 73.33% | 33.33% | 60.00% | 63.33% | 33.33% | 36.67% | N/A | 50.00% |
| 3. Trans. | 28.73% | 53.33% | 3.33% | 6.67% | 20.00% | 16.67% | 23.33% | 20.00% | 53.33% | N/A | 43.33% |
| II. Actual | | | | | | | | | | | |
| 1. Reenerg. | 28.42% | 11.20% | 69.59% | 36.64% | 50.89% | 13.70% | 28.08% | 54.92% | 21.54% | N/A | 10.49% |
| 2. Adj. | 46.12% | 39.41% | 30.41% | 54.42% | 49.11% | 59.84% | 64.42% | 34.68% | 28.41% | N/A | 72.63% |
| 3. Trans. | 25.45% | 49.38% | 0.00% | 8.94% | 0.00% | 26.45% | 7.50% | 10.40% | 50.05% | N/A | 16.88% |
| ABS DIFF | 12.7735% | 21.8318% | 15.2797% | 12.6095% | 13.3333% | 6.5230% | 10.5556% | 6.3980% | 7.6962% | N/A | 17.6375% |
| Correlation | | | | | | | | | | | |
| 1. Reenerg. | 0.65299 | | | | | | | | | | |
| 2. Adj. | 0.57538 | | | | | | | | | | |
| 3. Trans. | 0.68798 | | | | | | | | | | |
| Average | 0.63876 | | | | | | | | | | |

Colgate-Palmolive Company — 26 Fortune Most Admired List — ABS DIFF 1.91% — Analyze: yes

I. Prediction (DB 2)

| | Value | Interval | 1. Reenerg. | 2. Adj. | 3. Trans. | | |
|---|---|---|---|---|---|---|---|
| A. Key Business Parameters | | | DB 4 | | | | |
| 1. Mkt Share/Revenue Ratio | -37.22% | Low | 100 | | | | |
| 2. Asset Intensity (Asset/Rev Ratio) | 0.81 | Low | | | 25 | | |
| 3. Change in Profitability | 0.010 | Incr. | | 100 | | | |
| B. Funding Strategy / Risk | | | | 29 | | | |
| 1. Company Beta | | N/A | | | | | |
| 2. Debt/Equity Ratio | 1.41 | Medium | | 125 | | | |
| 3. Creditworthiness | 1.56 | High | | 25 | | | |
| 4. Cash Flow/Revenue Ratio | 0.14 | Medium | | | | | |
| C. Market | | | | | | | |
| 1. Relative Market Share | 0.23 | Medium | 200 | | | | |
| 2. Change in Market Share | -0.61 | Zero | 150 | | | | |
| 3. Relative Elasticity of Demand | 2.00 | Low | | | 25 | | |
| Growth Strategy | | Growth Strategy | 60.00% / 450 | 33.33% / 250 | 6.67% / 50 | 100.00% / 750 | |

II. Actual (DB 3)

| | Value | Interval | 1. Reenerg. | 2. Adj. | 3. Trans. | | |
|---|---|---|---|---|---|---|---|
| A. Business Structure | | | | | | | |
| 1. Business Mix | 5.64% | Low | | | | | |
| 2. Business Age | 194.00 | High | | | | | |
| 3. Number of Divisions | 2.00 | Low | 25 | | | | |
| 4. Number of SIC Industries | 2.00 | Low | 25 | | | | |
| B. Business Strategy | | | | | | | |
| 1. R&D Investment | 1.85% | Low | 56 | 38 | | | |
| 2. Acquisition Strategy | | | 42 | 42 | 24 | | |
| 3. Strategic Intent | | | | | | | |
| Growth Strategy | | Growth Strategy | 58.89% / 148 | 31.58% / 79.5 | 9.53% / 24 | 100.00% / 252 | |

FIG. 9B

| | A | B | C | D | E | F | G | H | I | J | K | L | M | N | O | P |
|---|---|---|---|---|---|---|---|---|---|---|---|---|---|---|---|---|
| 39 | | | III. Data | | | | | | DB 1 | | | | | | | |
| 40 | | | | | | | | | | | | | | | | |
| 41 | | | | | | | | | | | | | | | | |
| 42 | | | Latest Year Data Available | | 1999 | | | 45a | Number of Years Data Available | | 4.00 | | Year Business Founded (4 digit) | | | 1806 |
| 43 | | | 1999 Revenues (in mil) | | 9118.20 | | | | 1999 Net Income (in mil) | | 937.30 | | Number of Business Divisions | | | 2.00 |
| 44 | | | 1998 Revenues (in mil) | | 8971.60 | | | | 1998 Net Income (in mil) | | 848.60 | | 1999 R&D Allocation (in mil) | | | 169.00 |
| 45 | | | 1997 Revenues (in mil) | | 9056.70 | | | | 1997 Net Income (in mil) | | 740.40 | | | | | |
| 46 | | | 1996 Revenues (in mil) | | 8749.00 | | | | 1996 Net Income (in mil) | | 635.00 | | Acq. Strategy: | 1. Reenerg. | | 50.00% |
| 47 | | | | | | | | | | | | | 43 → | 2. Adj. | | 50.00% |
| 48 | | | 1999 Assets (in mil) | | 7423.10 | | | | 1999 Market Share (%) | | 11.44% | | | 3. Trans. | | 0.00% |
| 49 | | | 1998 Assets (in mil) | | 7685.20 | | | | 1998 Market Share (%) | | 11.51% | | | Total | | 100.00% |
| 50 | | | 1999 Debt Outstanding (in mil) | | 2582.20 | | | | 1999 Largest Player's Revenue | | 39,740.00 | | | | | |
| 51 | | | 1999 Shareholder's Equity (in mil) | | 1833.70 | | | | Number of SIC Industries Involved | | 2.00 | | Strategic Intent: | 1. Reenerg. | | 56.00% |
| 52 | | | 1999 Liabilities (w/o Debt) | | 3007.20 | | | | Elasticity Sum of All Industries | | 4.00 | | 47 → | 2. Adj. | | 28.00% |
| 53 | | | 1999 Net Cash from Oper. Activ. | | 1292.70 | | | | Company Beta H xxx | | 1.42 | | | 3. Trans. | | 16.00% |
| 54 | | | 1999 Cash at End of Year (in mil) | | 199.60 | | | | Company Beta Switch | | | | | Total | | 100.00% |
| 55 | | | 1999 Interest Paid | | 171.60 | | | | | | | | | | | |
| 56 | | | Business Mix | | | | 1998 | | | | 1999 | | | % Change in Share | | |
| 57 | | | Geography Region | Revenues | % Share | Assets | | % Share | Revenues | | % Share | Assets | | Revenues | Assets | |
| 58 | | | Region1 | 3,043.40 | 33.92% | | | 0.00% | 3213.00 | | 35.24% | | | 3.88% | N/A | |
| 59 | | | Region2 | 2407.90 | 26.84% | | | 0.00% | 2356.70 | | 25.85% | | | -3.70% | N/A | |
| 60 | | | Region3 | 2067.70 | 23.05% | | | 0.00% | 2028.80 | | 22.25% | | | -3.46% | N/A | |
| 61 | | | Region4 | 1452.60 | 16.19% | | | 0.00% | 1519.70 | | 16.67% | | | 2.94% | N/A | |
| 62 | | | Region5 | | 0.00% | | | 0.00% | | | 0.00% | | | N/A | N/A | |
| 63 | | | Region6 | | 0.00% | | | 0.00% | | | 0.00% | | | N/A | N/A | |
| 64 | | | Business Segment | | | | | | | | | | | | | |
| 65 | | | Segment1 | 7975.70 | 88.90% | | | 0.00% | 8048.90 | | 88.27% | | | -0.70% | N/A | |
| 66 | | | Segment2 | 995.90 | 11.10% | | | 0.00% | 1069.30 | | 11.73% | | | 5.64% | N/A | |
| 67 | | | Segment3 | | 0.00% | | | 0.00% | | | 0.00% | | | N/A | N/A | |
| 68 | | | Segment4 | | 0.00% | | | 0.00% | | | 0.00% | | | N/A | N/A | |
| 69 | | | Segment5 | | 0.00% | | | 0.00% | | | 0.00% | | | N/A | N/A | |
| 70 | | | Segment6 | | 0.00% | | | 0.00% | | | 0.00% | | | N/A | N/A | |
| 71 | | | Segment7 | | 0.00% | | | 0.00% | | | 0.00% | | | N/A | N/A | |
| 72 | | | Segment8 | | 0.00% | | | 0.00% | | | 0.00% | | | N/A | N/A | |
| 73 | | | Segment9 | | 0.00% | | | 0.00% | | | 0.00% | | | N/A | N/A | |
| 74 | | | Segment10 | | 0.00% | | | 0.00% | | | 0.00% | | | N/A | N/A | |

42a

All Factors

49a

| | 3Com Corporation | | | Adams Resources & Energy, Inc. | | | Colgate-Palmolive Company | | | Compaq Computer Corporation | | |
|---|---|---|---|---|---|---|---|---|---|---|---|---|
| | Analyze Value | Yes | Interval | Analyze Value | Yes | Interval | Analyze Value | Yes | Interval | Analyze Value | Yes | Interval |
| I. Prediction | | | | | | | | | | | | |
| A. Key Business Parameters | | | | | | | | | | | | |
| 1. Mkt Share/Revenue Ratio | -455.14% | Low | Low | 20.47% | Medium | Low | -37.22% | Low | Low | -69.67% | Low | Low |
| 2. Asset Intensity (Asset/Rev Ratio) | 0.78 | Low | Low | 0.07 | Low | Low | 0.81 | Low | Low | 0.71 | Low | Low |
| 3. Change in Profitability | -0.97% | | Decl. | -0.07% | | Zero | 1.01% | | Incr. | -1.70% | | Decl. |
| B. Funding Strategy / Risk | | | | | | | | | | | | |
| 1. Company Beta | | N/A | | | N/A | | 1.41 | N/A | | 0.03 | N/A | |
| 2. Debt/Equity Ratio | 0.01 | Low | | 0.27 | Medium | | 1.56 | Medium | | 1.31 | Medium | |
| 3. Creditworthiness | 1.50 | High | | 0.03 | Low | | 0.14 | High | | 0.03 | High | |
| 4. Cash Flow/Revenue Ratio | 0.20 | High | | 0.00 | Low | | | Medium | | | Low | |
| C. Market | | | | | | | | | | | | |
| 1. Relative Market Share | 0.34 | Medium | | 0.28 | Medium | | 0.23 | Medium | | 0.44 | High | |
| 2. Change in Market Share | -29.54% | | Decl | 20.96% | | Incr. | -0.61 | | Zero | -16.44% | | Decl. |
| 3. Relative Elasticity of Demand | 3.00 | Medium | | 2.67 | Low | | 2.00 | Low | | 3.00 | Medium | |
| II. Actual | | | | | | | | | | | | |
| A. Business Structure | | | | | | | | | | | | |
| 1. Business Mix | 102.45% | High | | 17.15% | Low | | 5.64% | Low | | 12.45% | Low | |
| 2. Business Age | 21.00 | High | | 53.00 | High | | 194.00 | High | | 18.00 | High | |
| 3. Number of Divisions | 4.00 | High | | 3.00 | Low | | 2.00 | Low | | 4.00 | High | |
| 4. Number of SIC Industries | 2.00 | Low | | 3.00 | High | | 2.00 | Low | | 2.00 | Low | |
| B. Business Strategy | | | | | | | | | | | | |
| 1. R&D Investment | 11.01% | High | | 0.00% | Low | | 1.85% | Low | | 4.31% | Low | |

FIG. 9D

| | A | B | C | AC |
|---|---|---|---|---|
| 1 | Strategy Table | | | |
| 2 | | | | |
| 3 | | Company | Average | Colgate-Palmolive Company |
| 4 | | | | |
| 5 | | Sheet Number | | 26 |
| 6 | | Analyze | | yes |
| 7 | | I. Prediction | | |
| 8 | | | | |
| 9 | | 1. Reenerg. | 24.12% | 60.00% |
| 10 | | 2. Adj. | 46.16% | 33.33% |
| 11 | | 3. Trans. | 29.73% | 6.67% |
| 12 | | II. Actual | | |
| 13 | | 1. Reenerg. | 28.42% | 58.89% |
| 14 | | 2. Adj. | 46.12% | 31.58% |
| 15 | | 3. Trans. | 25.45% | 9.53% |
| 16 | | | | |
| 17 | | ABS DIFF | 12.7735% | 1.9111% |
| 18 | | | | |
| 19 | | Correlation | | |
| 20 | | 1. Reenerg. | 0.65299 | |
| 21 | | 2. Adj. | 0.57538 | |
| 22 | | 3. Trans. | 0.68798 | |
| 23 | | | | |
| 24 | | Average | 0.63878 | |
| 25 | | | | |

FIG. 9E

"Fill In New Client Name"          "Fill in Qualifying Criteria"

NC 2 — 69b          — 69c

| | Value | Interval | NC 4 |
|---|---|---|---|
| | | | 1. Reenerg. 2. Adj. 3. Trans. |
| I. Prediction | | | |
| A. Key Business Parameters | | | |
| 1. Mkt Share/Revenue Ratio | #DIV/0! | N/A | |
| 2. Asset Intensity (Asset/Rev Ratio) | N/A | N/A | |
| 3. Change in Profitability | N/A | N/A | |
| B. Funding Strategy / Risk | | | |
| 1. Company Beta | N/A | N/A | |
| 2. Debt/Equity Ratio | N/A | N/A | |
| 3. Creditworthiness | #DIV/0! | N/A | |
| 4. Cash Flow/Revenue Ratio | N/A | N/A | |
| C. Market | | | |
| 1. Relative Market Share | N/A | N/A | |
| 2. Change in Market Share | N/A | N/A | |
| 3. Relative Elasticity of Demand | N/A | N/A | |
| | Growth Strategy | | #DIV/0!   #DIV/0!   #DIV/0!   #DIV/0! |
| | | | 0        0        0        0 |

NC 3

| | Value | Interval | 1. Reenerg. 2. Adj. 3. Trans. |
|---|---|---|---|
| II. Actual | | | |
| A. Business Structure | | | |
| 1. Business Mix | N/A | N/A | 0   0   0 |
| 2. Business Age | N/A | N/A | 0   0   0 |
| 3. Number of Divisions | N/A | N/A | 0   0   0 |
| 4. Number of SIC Industries | N/A | N/A | 0   0   0 |
| B. Business Strategy | | | |
| 1. R&D Investment | N/A | N/A | 0   0   0 |
| 2. Acquisition Strategy | | | 0   0   0 |
| 3. Strategic Intent | | | |
| Growth Strategy | | | #DIV/0!   #DIV/0!   #DIV/0!   #DIV/0! |
| | | | 0        0        0        0 |

FIG. 10B

III. Data

Latest Year Data Available    Number of Years Data Available    Year Business Founded (4 digit)
0 Revenues (in mil)    0 Net Income (in mil)    Number of Business Divisions
  (1) Revenues (in mil)     (1) Net Income (in mil)    1999 R&D Allocation (in mil)
  (2) Revenues (in mil)     (2) Net Income (in mil)    Acq. Strategy:    1. Reenerg.
  (3) Revenues (in mil)     (3) Net Income (in mil)      2. Adj.
         3. Trans.
0 Assets (in mil)    0 Market Share (%)      Total    0%
  (1) Assets (in mil)     (1) Market Share (%)    Strategic Intent:    1. Reenerg.
0 Debt Outstanding (in mil)    0 Largest Player's Revenue      2. Adj.
0 Shareholder's Equity (in mil)    Number of SIC Industries Involved      3. Trans.
0 Liabilities (w/o Debt)    Elasticity Sum of All Industries      Total    0%
0 Net Cash from Oper. Activ.    Company Beta Hard
0 Cash at End of Year (in mil)    Company Beta Switch
0 Interest Paid
Business Mix                                                   % Change in Share

| Geography Region | Revenues | % Share | Assets | % Share | Revenues | Assets |
|---|---|---|---|---|---|---|
| Region1 |  | #DIV/0! |  | #DIV/0! | N/A | N/A |
| Region2 |  | #DIV/0! |  | #DIV/0! | N/A | N/A |
| Region3 |  | #DIV/0! |  | #DIV/0! | N/A | N/A |
| Region4 |  | #DIV/0! |  | #DIV/0! | N/A | N/A |
| Region5 |  | #DIV/0! |  | #DIV/0! | N/A | N/A |
| Region6 |  | #DIV/0! |  | #DIV/0! | N/A | N/A |
| Business Segment |  |  |  |  |  |  |
| Segment1 |  | #DIV/0! |  | #DIV/0! | N/A | N/A |
| Segment2 |  | #DIV/0! |  | #DIV/0! | N/A | N/A |
| Segment3 |  | #DIV/0! |  | #DIV/0! | N/A | N/A |
| Segment4 |  | #DIV/0! |  | #DIV/0! | N/A | N/A |
| Segment5 |  | #DIV/0! |  | #DIV/0! | N/A | N/A |
| Segment6 |  | #DIV/0! |  | #DIV/0! | N/A | N/A |
| Segment7 |  | #DIV/0! |  | #DIV/0! | N/A | N/A |
| Segment8 |  | #DIV/0! |  | #DIV/0! | N/A | N/A |
| Segment9 |  | #DIV/0! |  | #DIV/0! | N/A | N/A |
| Segment10 |  | #DIV/0! |  | #DIV/0! | N/A | N/A |

FIG. 10C

DIAGNOSTIC METHOD AND APPARATUS FOR BUSINESS GROWTH STRATEGY

BACKGROUND OF THE INVENTION

Business strategy, by which is meant the set of decisions governing how to compete in the private sector, has long been the subject of careful deliberation. Most large companies have a senior employee charged with strategic planning, if not whole departments established for this purpose. It is commonplace, too, for companies to engage the help of professional outsiders (consultants, management consultants, strategy consultants, efficiency experts . . . they go by many names) to advise them in how best to set company strategy.

Typically the individuals engaged in this field rely on a set of highly qualitative texts and tools to develop decisions. Some of the most common examples include: SWOT analysis, Michael Porter's Five Forces Model, the BCG Growth-Share Matrix. Each of these outlines a way to structure and depict company information, that then corresponds to some prescriptive wisdom of how to behave strategically. For example, for divisions performing in the upper left quadrant of a Growth-Share Matrix, which would be labeled "Stars", the prescription is to "invest for leadership".

A few tools, such as the Experience Curve or EVA (Economic Value Added), are quite rigorously quantitative, but fall short in providing specificity around what is to be done as a result of whatever information the analysis yields. In this manner, they are closer to being metrics than diagnostic tools, and as such bear most in common with the Baldrige criteria or the "Balanced Scorecard" concepts.

One of the highest level types of strategy is Growth Strategy. There are a range of tactics typical of companies trying to grow company profits. These tactics might include acquisitions, new product introduction, cost reduction, share gain in existing markets, and new market entry. While there are techniques specific to screening acquisitions, or prioritizing alternative markets for entry decisions, there is no known tool for determining what is the optimal mix of the various types of alternative growth initiatives.

SUMMARY OF THE INVENTION

The invention is an algorithm for analyzing and interpreting private-sector firm financial and competitive information for a given company so as to diagnose the optimal mix of growth strategy imperatives for that firm.

The mix of growth strategy is defined using the distribution among three mutually exclusive categories of strategy. Using Applicant's language, those strategy categories or components are: Re-energize the Core, Explore Adjacent Markets, and Drive Transformation. Applicant has built the present invention to specifically determine which mix of growth activities (as defined using a Growth Framework and those latter definitions) is most appropriate to a given company at a given point in its development.

The inventive features, which are further detailed below, fall into the four following general areas:
1. Identification of the key elements, and algorithm for the (fact-based) correlation between: predictive factors for determining the best mix of strategies, actual (estimated) strategy behavior, and business success (which by implication resulted from that strategy)
2. Diagnostic functionality for a given company to identify recommended growth strategy mix
3. Resource implications (inputs and outputs) of the recommended strategy mix
4. Identified "peer group" sharing a common pattern for that strategic mix
1. Identification of the key elements, and algorithm for the (fact-based) correlation between: predictive factors for determining the best mix of strategies, actual (estimated) strategy behavior, and business success (which by implication resulted from that strategy). The inventive features here include:
   Identification and inclusion of the 85 Most Important Growth Companies
   Identification of the key determining factors
      Both predictive and actual
      Including the calculations necessary to move from raw data to specific metric
      Plus the unique approach to calibrating actual strategy, which relies substantially on the inventor's practices for categorizing corporate statements into which strategy those statements represent
   Comparison of the strategic mix implied by the "predictive" and "actual" factors to calculate a correlation (r-squared) and variance (average absolute difference in specific strategy emphasis)
   Weightings for each of the factors, including:
      the current specific weightings
      the concept of weighting factors differently, and the formulae dictating the importance each factor is given in determining the optimal strategy mix
      the practice of comparing impact on the overall correlation between predicted and actual behaviors, as a basis for (re)setting factor weights
   Establishing interval cutoffs to define which specific range of values for each factor will correlate with what level of emphasis on each of the three alternative types of strategy, including:
      the relevance accorded to relative (high, medium, low) values for any specific factor, as indicators of which mix of strategies should optimally be emphasized
      the algorithms and methodology used to calculate those interval cutoffs
      the actual cutoffs that are currently used to define those parameters also reflect an inventive feature
2. Diagnostic functionality for a given company to identify recommended growth strategy. The inventive features here include:
   The algorithm, which is built from many years of consulting experience, that distills the environmental and performance features suggesting a preferred mix of strategies for any given company
   A method of scoring the responses to calculate a mix, expressed as percentages totaling 100% overall
      in the case of the electronic version, this reflects the criteria weighting and (potentially dynamic) intervals
      in the case of the paper version, the scoring components are developed so that they automatically total 100% regardless of the mix of responses
   Format, which comes in both the model (electronic) and self-diagnostic (paper) version
3. Resource implications (inputs and outputs) of the recommended strategy mix. The inventive features here include:
   an algorithm for calculating, given the relative percentage mix of strategies, the corresponding relative mix of requisite inputs such as manpower, time, and investment dollars divided across each of the three types of strategies an algorithm for calculating, given the relative percentage mix of strategies, the corresponding relative mix of resulting outputs such as incremental revenues and incremental profits 4. Identified "peer group" sharing a common pattern for that strategic mix. The inventive features here include:

definition and characterization of 5 different patterns of strategy mix a decision tree for use in classifying strategy mix pattern a basis for identifying companies in a similar strategic situation, although they may not share a common industry lessons that can be generalized for companies reflecting a given strategy pattern

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 5A–5G are illustrations of an intervals worksheet, conversion worksheet, valid arguments worksheet, thresholds percentile and thresholds fixed worksheets, scoring worksheet, and a factors and strategies worksheet from the settings workbook of FIG. 2.

FIGS. 6A–6B are illustrations of database worksheets in the database workbook of FIG. 1.

FIGS. 7A–7B are illustrations of a market share to revenue ratio worksheet and an all factors worksheet, respectively, in the calculations workbook of FIG. 3.

FIG. 8 is an illustration of a strategy table of the results workbook of FIG. 1.

FIGS. 9A–9E are illustrations of database, results and calculations worksheets for an example company illustrating the flow of operations of FIG. 4.

FIGS. 10B–10C illustrate worksheets employed by the modules in FIG. 10A.

DETAILED DESCRIPTION OF THE INVENTION

Outline—Preferred Embodiment

I. Four Workbooks
  a. Settings
    i. Overview
    ii. Intervals
    iii. Conversion
    iv. Factors & Strategy
    v. Scoring
    vi. Thresholds Percentile
    vii. Thresholds Fixed
    viii. Valid Arguments
  b. Database
    i. Overview
    ii. DB1 Module
    iii. DB2 Module
    iv. DB3 Module
    V. DB4 Module
  c. Calculations
    i. Overview
    ii. Calc.1
    iii. Calc.2
  d. Results
II. New Client Analysis Module Overview
III. Workflow Drawing—Model Companies
IV. Workflow Drawing—New Client Analysis
V. Strategic Self Diagnostic
VI. Equivalents

DETAILED DESCRIPTION OF THE PREFERRED EMBODIMENT

Figure 1:
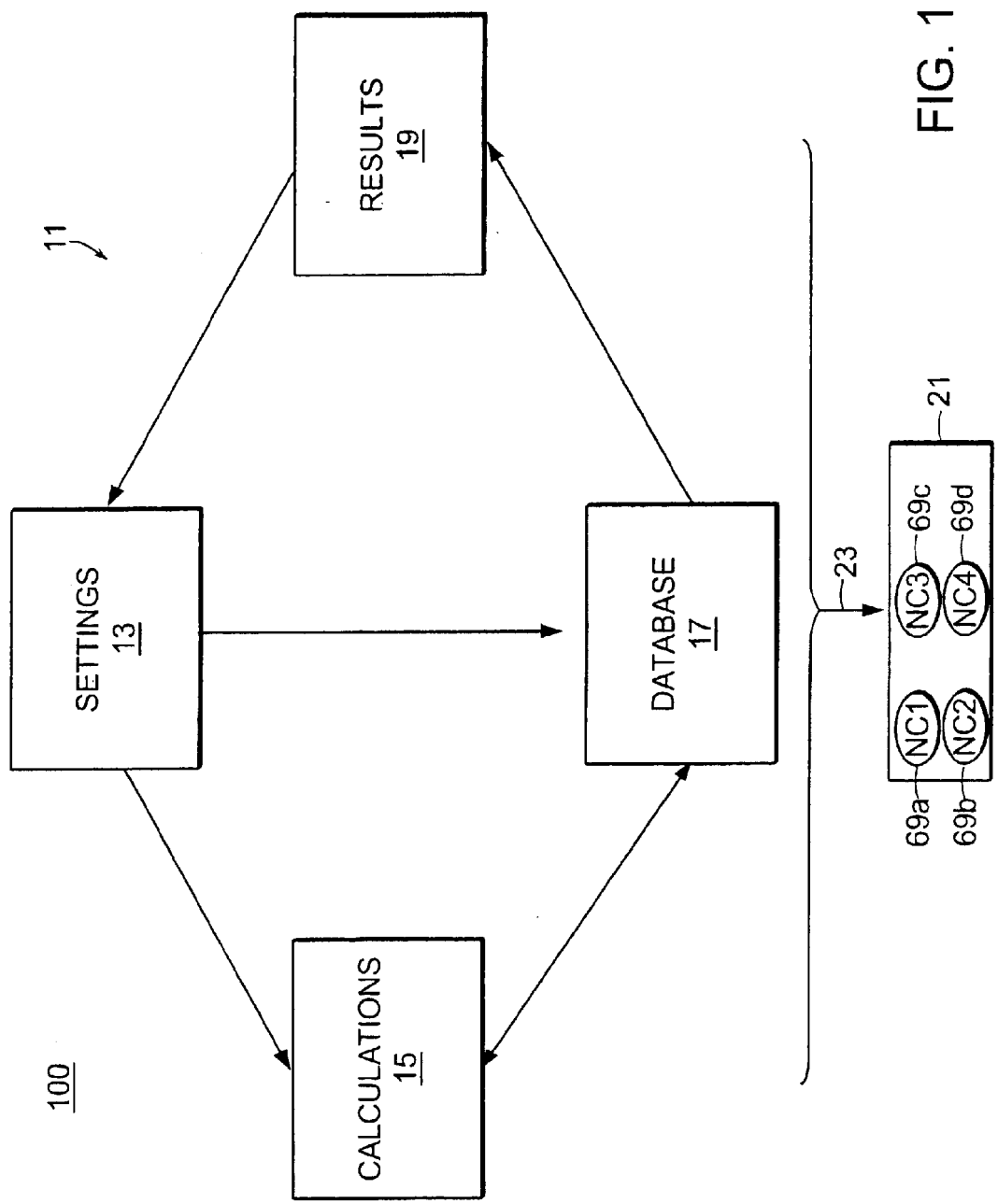
FIG. 1 is an overview block diagram of one embodiment of the present invention formed of a settings workbook, a database workbook, a calculations workbook and a results workbook.
Figure 2:
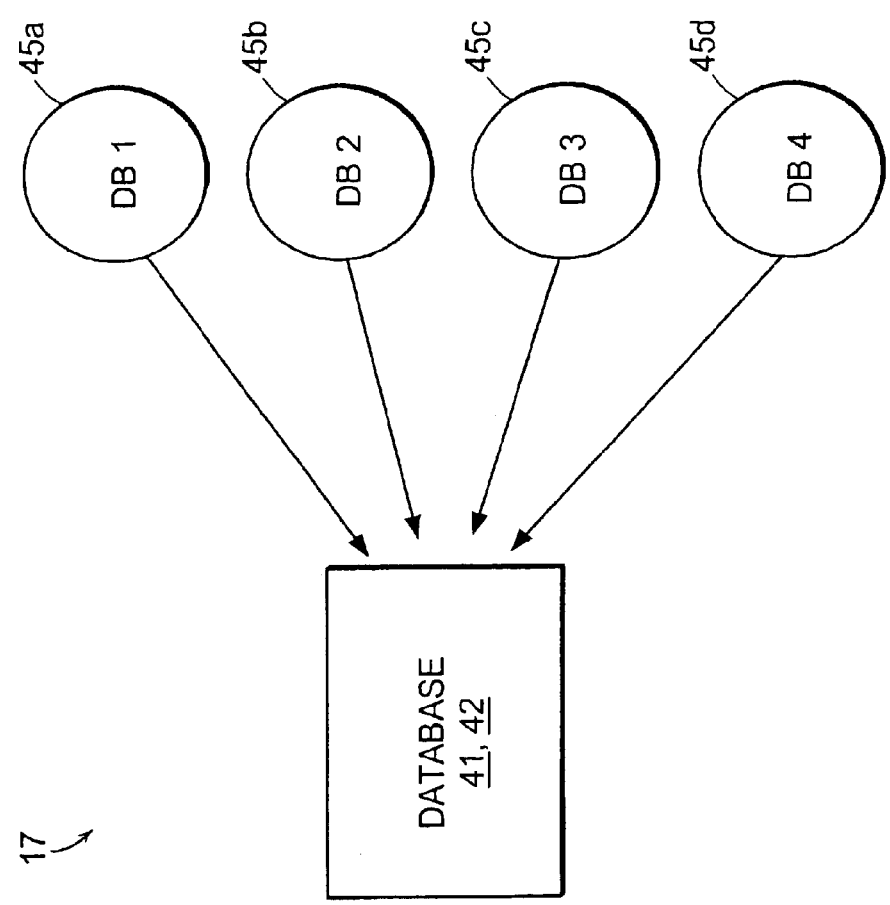
FIG. 2 is a schematic view of the settings workbook of the embodiment of FIG. 1.
Figure 3:
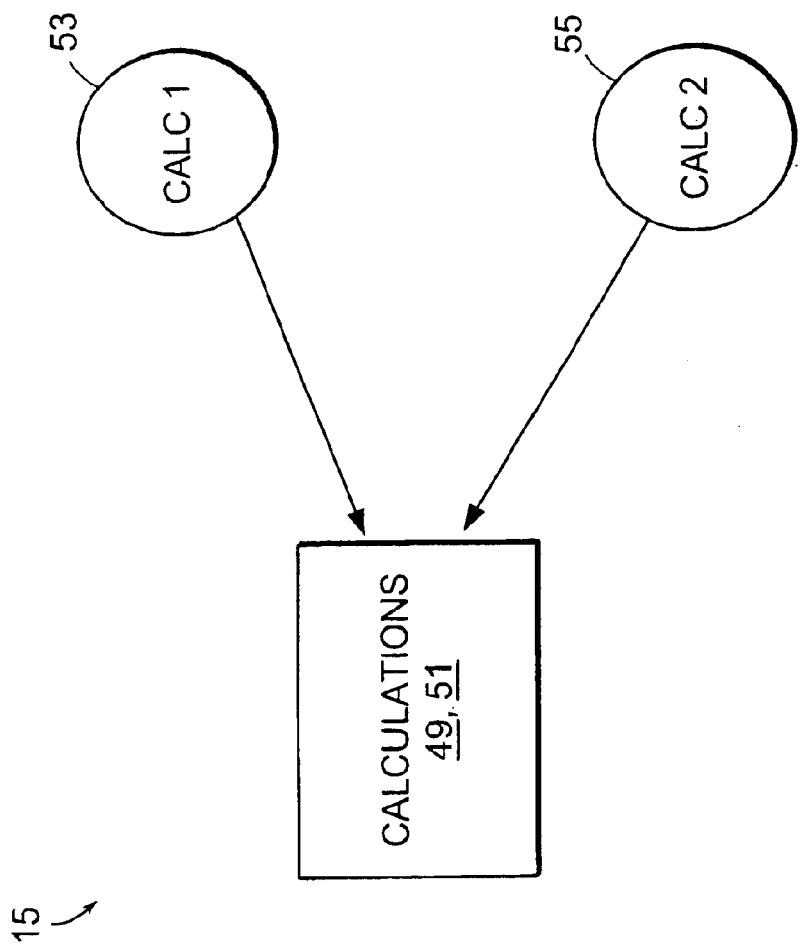
FIG. 3 is a schematic view of the calculations workbook of FIG. 1.

Illustrated in FIG. 1 is an overview of the invention (or "Tool" 11). The preferred embodiment of the invention is comprised of five linked Microsoft Excel97workbooks (i.e., sets of electronic spreadsheets), named "Settings 13," "Calculations 15," "Database 17", "Results 19," and "New Client Analysis 21." The Tool 11 could reasonably be operated on any machine 100 capable of running this version of Excel or compatible electronic spreadsheet program. Each of these workbooks contains multiple worksheets (spreadsheets) and algorithms. To better elucidate the flow of information through the Tool 11, multiple calculating modules within certain worksheets (as shown in FIG. 2 and FIG. 3) will be described separately. While integral to their respective workbooks, each of these modules could also exist as a separate file with links to relevant information. Throughout the drawings, whole workbooks are indicated by rectangles, while the calculating modules contained within workbooks are shown as circles. Direct electronic flows of data that are necessary to other calculations within the invention are shown as solid arrows. Dashed arrows represent data flows that have only indirect impacts on the operations of the Tool.

It is understood that other electronic spreadsheets, data structures and the like are suitable for carrying out the functions and operations herein described. Thus, the present invention is not limited to, but merely illustrated by, the disclosed electronic workbooks/worksheets and corresponding calculation modules. It is further understood that the electronic implementation of the present invention occurs in working memory of a computer or digital processing system 100, whether a stand alone computer, distributed processor or networked (globally, locally or wide area) over suitable communications channels included in 100 of FIG. 1.

As FIG. 1 demonstrates, there is a direct electronic flow of data from Settings 13 to both Database 17 and Calculations 15. There are also direct flows between Database 17 and Calculations 15 and from Database 17 to Results 19. The data in Results 19 does flow into Settings 13, but adds value primarily as feedback to the one who has set the parameter values contained in Settings 13. The feedback data imported into Settings 13 is not further manipulated in the Settings workbook 13.

SETTINGS. Referring now to FIGS. 5A–5G, the Settings workbook 13 contains seven worksheets. One of the seven worksheets is the Intervals worksheet 25 illustrated in FIG. 5A. The Intervals worksheet 25 is the primary source of data for many other parts of the workbook 13. This sheet 25 contains the interval values (ex: High, Medium, Low) that profile seventeen determining factors 27 in the development of strategic recommendations. These factors 27 have been developed using a combination of analytical data and industry experience and are divided into predictive and actual (observed) measures. The predictive factors include, for example, business parameters (such as market share to revenue ratio, asset to revenue ratio and change in profitability), funding strategy or risk and market factors. In the preferred embodiment, the funding strategy or risk factor is described by four variables, namely company Beta, debt to equity ratio, credit worthiness and cash flow to revenue ratio. The market factor is described by three variables. Specifically, one indicates relative market share, a second variable indicates change in market share. The third variable indicates relative elasticity of demand.

Also included as determining factors 27 are business structure and business strategy variables, which are used to measure actual (observed) practices of companies. As shown in FIG. 5A, these variables indicate business mix, business age, number of divisions, number of SIC industries, Research and Development (R&D) investment, acquisition strategy and strategic intent.

For each of the category variables 27, respective values of low, medium or high are set for the subject strategy categories 29, i.e., re-energize, adjacency and transformation. That is, for each factor variable 27, (i) one of the subject strategy categories 29 (re-energize, adjacency or transformation) is set to "high", (ii) another category 29 is set to "medium", and (iii) the remaining category 29 is set to "low". This effectively profiles the determining factors 27 indicated by these variables.

Take the Cash Flow/Revenue Ratio as an example variable of the funding strategy/risk factor 27. As illustrated in FIG. 5A, the values for Reenergize, Adjacency, and Transformation are designated as Low, High, and Medium, respectively. This means, for example, that a "High" Cash Flow/Revenue Ratio, as defined in the invention, is believed to be beneficial to a growth plan which focuses on exploring Adjacencies. Similar conclusions may be drawn with the other intervals and growth plans per subject categories 29. The threshold type 31 for each variable is also defined in the interval worksheet 25. In this example, each variable (except business age) is measured using percentile thresholds. However, fixed or absolute values are suitable threshold types 31 that may be used in other embodiments. There are percentage threshold and fixed threshold worksheets 37, 39 which define these thresholds as discussed below.

Turning now to FIG. 5B, a Conversion worksheet 33 helps to facilitate the evaluation of data in the Calculations workbook 15. This worksheet 33 combines data from the Valid Arguments (FIG. 5C) and Intervals worksheets 32, 25 to provide consistency of terminology throughout the Tool 11. For each factor variable 27/"key variable" (see "Database") and subject growth strategy category 29, a numerical value is assigned that links to a corresponding interval value for the item. In the Calculations workbook 15, the Conversion worksheet 33 of the Settings workbook 13 is used to define the values by which companies are ranked.

A sample conversion workbook 33 from the settings workbook 13 is illustrated in FIG. 5B. Following the previous example, the intervals for the Cash Flow/Revenue Ratio are listed as 1, 3, and 2, respectively. The Tool 11 has drawn these values by comparing the Low, High, and Medium values listed in the Intervals worksheet 25 with the numerical settings for these predictive intervals as determined in the Valid Arguments worksheet 42. These numerical values are later used in cells D13:15 of the individual factor worksheets of the Calculations workbook 15.

FIG. 5C illustrates a sample valid arguments worksheet 32 for the settings workbook 13 in the preferred embodiment. The Valid Arguments worksheet 32 designates the terms that may be appropriately used to reference each calculated interval. This worksheet 32 is referenced by multiple sources throughout the Tool 11. It is essential to ensure uniformity of data and consistency of analysis. As mentioned above, these values are used to link the thresholds set in the settings workbook to the values in Calculations workbook 15. By doing so, each of the individual variable worksheets in Calculations 15 is given a standardized format whether it is measuring actual or predictive determining factors 27.

A Factors & Strategy worksheet 38 (FIG. 5G) is used in several places throughout the tool as a reference. It lists the names of the seventeen key variables (see "Database") on which each company is currently being evaluated. Different embodiments of the invention may use different key variables. Having these references in a central repository ensures uniformity throughout the invention and facilitates future modifications. For example, each of the one hundred individual company worksheets in the database workbook 17 is linked to the Factors & Strategy worksheet 38. This allows the user to easily update the rest of the Tool 11 when necessary by simply changing the factors on this one worksheet 38.

As illustrated in FIG. 5D, the Scoring worksheet 35 is similar in appearance to the Intervals worksheet 25, as both are linked to the terms listed in the Factors & Strategy worksheet 38. This sheet 35 contains a numerical weight for each interval value defined in the Intervals worksheet 25. These weights are ultimately used to determine the optimal percentage mix of the three growth strategy categories 29. The values contained herein emphasize the most relevant measures for growth strategy. They have been set through an iterative process that enhances correlation between the predictive aspects of the Tool 11 and the observed results of successful growth companies. So, a company that has been determined as having a "High" Cash Flow/Revenue Ratio, as in the example above, would receive twenty five points in the category 29 of Adjacency in the DB4 calculations.

Figure 5E:
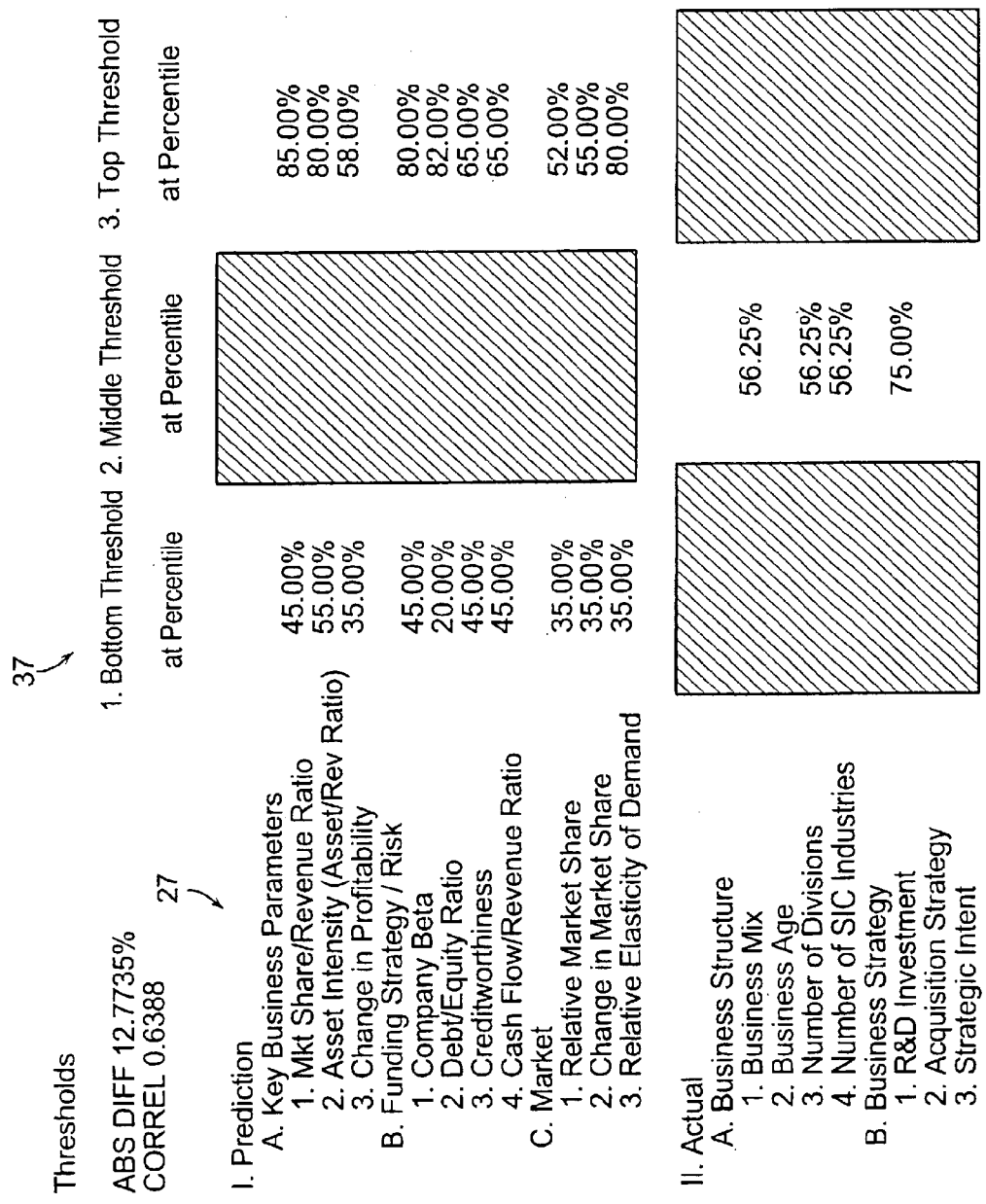

Illustrated in FIG. 5E is a Threshold Percentile worksheet 37 of the Settings Workbook 13. The Thresholds Percentile worksheet 37 is linked to the terms of the Factors & Strategy worksheet. This worksheet 37 contains the values that are used to determine the bounds for each interval value of each key variable 27 being analyzed, except for Acquisition Strategy, Strategic Intent and Business Age. For the Cash Flow/Revenue Ratio, the low and high thresholds have been set at the forty-fifth and sixty-fifth percentiles, respectively. This means that a company with a ratio that is greater than or equal to those of the highest sixty-five percent of ratios measured in the data set are categorized as "High."

The Thresholds Fixed worksheet 39 (FIG. 5F) contains predetermined cutoff values for Market Share/Revenue ratio and Business Age. Only the Business Age measure is currently used in the preferred embodiment.

DATABASE. Illustrated in FIG. 2 is an overview of the Database workbook 17, which is comprised of four primary modules 45a, b, c, d. Each module 45 is contained on each of the individual company worksheets 42 contained in this file. In the preferred embodiment, there are one hundred such company worksheets 42, but in other embodiments, there may be more or less in number of companies under analysis. These companies span a wide range of industries, business ages, and structures but each has demonstrated impressive growth that others may want to emulate. This is evidenced by the fact that each company in the Tool 11 is featured on at least one of the following lists for 1999 or 2000: the Deloitte & Touche Technology 500, the Fortune e50, the Fortune Fastest Growth (1, 5, or 10 years), or the Fortune Most Admired. There is a worksheet 41 in the database workbook 17 which serves as an index to the analysis companies in the Tool 11.

Through extensive research and experimentation, the Applicant has concluded that fifteen of the current one hundred companies in the database do not fit well in the invention. In an effort to further enhance the correlation between the Tool's 11 predictive and actual results, fifteen of the companies contained in the preferred embodiment of the Tool 11 have been removed from the analysis, or "turned-off," although they are still fully calculated in DB2 and DB3. These companies did not fit well with the remaining companies being examined for a number of reasons. Some experienced extraordinary changes such as acquisition or major ownership change during periods under analysis. Others participated in business activities not suited to this form of analysis, like the investment companies. Eliminating these companies from final analysis still leaves eighty-five active companies with a wide range of industry coverage in the Tool 11. As new data becomes available or new factors 27 are added to the Tool 11, one may change the number or composition of the companies on this list. These eighty-five form the data set against which any new client data will be evaluated.

Each calculating module 45 is exercised at a different point in the workflow analysis. As illustrated in FIG. 6B, the first module 45a, DB1, appears on the lower half of each of the one hundred individual company worksheets 42. This is the repository for a variety of data that has been selected for its relevance to potential future growth strategies. The data selected includes: annual revenues (for up to four years), annual revenues by geographic region (for two years), annual revenues by business segment (for two years), Assets (for up to two years), Debt Outstanding, Shareholder's Equity, Liabilities (w/o Debt), Net Cash from Operating Activities, Cash at End of Year, Interest paid, Net Income (for up to four years), Market Share as a percentage (for up to two years), the Revenues of the Largest Player in the market, number of SIC Industries Involved, the Elasticity Sum of all Industries in which a company competes (currently inactive), Company Beta (currently inactive), the Year Business was Founded, the Number of Business Divisions, and R&D Allocation.

All of the data contained in DB1 has been selected for its relevance to growth strategy. A company's relative abilities to leverage existing resources, generate new capital, and expand its operations into different markets all have significant bearing on choices of growth strategy. All of the data is entered into a company worksheet 42 from sources such as information generally available to the public and compilations from corporate annual reports and Securities and Exchange Commission filings. Some pieces of data, including those relating to competitors in the market, have been obtained from subscription services, including Hoovers On-Line: The Business Network. This data is used to predict the methods that these successful companies have used to produce growth. Based on their successes, the tool 11 uses this data to prescribe growth strategy mixes (plans) for similarly situated companies that are seeking help growing.

Returning to FIG. 6B, DB1 also contains data 43, 47 that has been developed by Applicant. This data 45, 47 is largely used to measure the actual strategic behavior of the successful growth companies that have been selected to supply data for the invention. The Actual (or observed) behaviors of companies are those which demonstrate the paths that each company followed to achieve their impressive growth. Several of the projections of Actual behavior have been confirmed in interviews with executives of the companies being studied. Two qualitative factors are being quantified here: Acquisition Strategy 43 and Strategic Intent 47. Both of these factors 43, 47 are rated by their relative values among the three potential growth strategy categories 29—Reenergize the Core (Reenergize), Explore Adjacencies (Adjacency), and Driving Transformation (Transformation).

Using a combination of industry experience and extensive research, the Applicant determined the percentage of each company's effort that was being directed toward each of these growth strategy categories 29. The primary source of company-specific information for these efforts was the President's letters that are included with corporate annual reports. Through a careful analysis of the content of these letters, insight was gained as to which growth strategy categories 29 the companies were implicitly pursuing. The Applicant personally read and scored each of the President's letters to insure consistency of the data.

As Applicant examined each letter, Applicant carefully identified statements for strategic use. Each new topic was categorized for its relevance toward pursuing one of the potential growth strategy categories. Each of these pronouncements was assigned an even weight of one unit, but scores could not be skewed through emphasis or repetition. Each substantive pronouncement was counted only once, regardless of the amount of verbiage used to describe it. In all, the Applicant catalogued nearly 2,100 separate statements.

Once these values had been assigned, they were totaled for each company included in the tool 11. Each company received raw scores for Strategic Intent 47 and Acquisition Strategy 43 broken down by growth strategy category 29. These scores were then tabulated to determine the percentage of the company's efforts directed toward each strategy category 29. The sum of the values equal 100% as they were intended to describe the totality of each company's efforts. These percentage values were then entered into the DB1 module 45a.

In developing this comparative invention, the Applicant established general parameters. For example, a statement in a letter indicating a movement to focus on items like cost reduction, operating improvements, or market share gain was scored as a strategic intent of the company to improve their current performance in their current market. These were categorized as intentions of a company to Reenergize the Core.

Acquisition Strategy 43 was similarly derived from the President's letters. For example, a company statement about an intention to make breakthrough acquisitions was categorized as driving market Transformations, while one that referenced acquisitions as a method to fill in gaps in its current business structure was really exploring Adjacencies and was categorized as such.

Turning to FIG. 6A, the second module 45b of the Database workbook 17, DB2, contains ten measures to predict profitable growth, herein called "key variables" 27. First, the module 45b contains three Key Business Parameters: Market Share/Revenue Ratio, Asset Intensity (or Asset/Revenue Ratio), and Change in Profitability. Then the module 45b examines four measures of Funding Strategy/Risk, namely Company Beta (currently inactive), Debt/Equity Ratio, Creditworthiness, and Cash Flow/Revenue Ratio. Finally, DB2 looks at a variety of Market measures including Relative Market Share, Change in Market Share, and Relative Elasticity of Demand (currently inactive).

The third module 45c within Database workbook 17, DB3, measures seven features of the one hundred companies in the database to demonstrate the correlation between the Tool's 11 predictive growth strategies and those employed by each company. It 45c contains four measures of Business Structure and three measures of Business Strategy. As illustrated in FIG. 6A, the Structure measures are Business Mix, Business Age, Number of Divisions, and Number of SIC Industries. The Strategy Measures are R&D Investment as a percentage of overall revenues, Acquisition Strategy, and Strategic Intent. These features are a part of the "key variables" 27.

Each of the measures in modules DB2 and DB3 has been chosen by the inventor for its ability to predict or measure strategic growth based on the DB1 data. As will be described, other measures may be added at a later date to keep the Tool 11 current with changing business conditions and market performance.

The final Database module 45d, DB4, produces the values that indicate a strategic growth distribution among the subject categories 29 for each company. For each valid key variable 27 measured in DB2 and DB3, calculating module 45d imports an interval value from the Calculations workbook 15. For each interval value, DB4 imports a weighted value from the Settings workbook 13. These weighted values are then tabulated by growth strategy category 29 to create the appropriate growth mix for the company.

CALCULATIONS. FIG. 3 is an overview of the Calculations workbook 15. Calculations 15 contains a summary sheet 49 called "All Factors" and a corresponding individual key variable worksheet 51 for each of the so-called key variables 27. Each of the two main modules 53, 55 appears in each of the key variable worksheets 51 that comprise the Calculations workbook 15. Calculations workbook 15 is organized by key variable factors 27, rather than by company.

In the preferred embodiment, fifteen of the seventeen factors 27 are listed as separate sheets within the workbook 15. The fifteen factors 27 include the key business parameters, the funding strategy/risk factors, the market factors, the business structure factors and the R&D Investment variable of the business strategy factors. The two remaining factors 27, i.e. Acquisition Strategy and Strategic Intent, are tallied outside of the Tool 11 and calculated within the Database workbook 17 as discussed above. Thus, they do not appear in the key variable worksheet 51 of the calculations workbook 15. The values produced in these worksheets 51 are summarized in the All Factors worksheet 49 (FIG. 7B).

For example, sheet I.A1 (worksheet 51a shown in FIG. 7A) analyzes each company using only the Market Share/Revenue Ratio. Each company's market share/revenue ratio is indicated with a respective bar in the bar graph of worksheet 51a. Such bars are automatically arrayed horizontally from lowest to highest values. As illustrated in FIG. 7b, the results for each company being analyzed are then drawn into row 9 of the All Factors worksheet 49 where the other rows list each company's score on all of the other variables 27 being measured.

Returning to FIG. 3, the first module 53, Calc.1, imports each company's score from DB2 or DB3 database modules 45b, c of FIG. 6A for the variable being measured and sorts the company scores along a horizontal array from low to high values. As illustrated in FIG. 7A, the company RAVISENT has the lowest market share to revenue ratio at −1975.11%, and Neurocrine has the next lowest at −1054.61% and so on reading across the top two rows 57 of FIG. 7A. The calculation module 53 further analyzes the imported data by calculating basic statistical information like the mean value, median value, minimum and maximum values, variance and standard deviation as illustrated at 59 in FIG. 7A. This statistical data is later used to help determine settings for interval values.

The second module 55, Calc.2, assigns interval values (of low, medium, high) to each imported and sorted score in Calc.1. This is accomplished utilizing array 61 (i.e., the block from worksheet cell G13:H15) which indicates numerical threshold values for each interval (low, medium, high) based on the percentile thresholds established in Settings workbook 13. That is, the range of market share to revenue ratio scores qualifying for an interval value of "low" is negative infinity to 3.43%. The range of market share/revenue ratio scores qualifying for an interval value of "medium" is −3.43% to 50.45%. The range of the subject key variable 27 (market share/revenue ratio) scores qualifying for an interval value of "high" is 50.45% to positive infinity. Calc.2 compares the numerical scores obtained in Calc.1 (indicated at 57 in FIG. 7A) to the three possible intervals defined in the aforementioned array 61. Based on that comparison, the subject determining factor is assigned one of the interval values of "low", "medium" and "high". As mentioned above, this information is aggregated in the All Factors worksheet 49 (FIG. 7B) and later exported to the Database file 17.

RESULTS. The Results workbook 19 (FIG. 1) consists of two worksheets, namely the Strategy Table and Strategy Chart. The Strategy Table 71 lists each company under review alphabetically from left to right as shown in FIG. 8. The predicted and actual percentage scores for each company in each of the three growth strategy categories are listed vertically down the appropriate columns. Results 19 calculates the average of the absolute difference of the variances between the predicted and actual behavior of the companies. Based on this data, the correlation of the Tool 11 between actual and predicted scores is calculated for the entire Tool. This correlative data is directly linked into the Settings workbook 13. It is used as a reference field during the iterative process to optimize the correlation between predicted and actual behavior of successful growth companies.

The Strategy Chart lays out the same imported information in a graphical form. It provides yet another useful way to view the data, but does not factor into any electronic calculations.

NEW CLIENT ANALYSIS. Also illustrated in FIG. 1 is the New Client Analysis workbook 21. The foregoing discussion of the settings, calculations and database workbooks 13, 15, 17 and corresponding modules from data of existing companies, a model 23 that quantifies respective amounts of the reengerize, adjacency and transformation components for different strategic growth mixes. That model 23 is applied to a subject company to determine in quantitative terms an appropriate strategic growth mix (i.e., quantitative amounts of the three strategy categories—reenergize, adjacency and transformation). In the preferred embodiment, manpower, time period and dollars investment are also determined for the proposed growth plan for the subject company.

Continuing with FIG. 1, the analysis of new clients has been separated from the remainder of the invention in order to protect the integrity of the model data within the Tool 11. New Client Analysis 21 essentially combines the functions of Database 17 and Calculations 15 into a single workbook. The data in this workbook 21 is not exported and thereby avoids influencing the remaining calculations of the invention.

The worksheet(s) within the New Client workbook 21 are very similar to those used for individual company analyses in Database workbook 17 illustrated in FIG. 2. The most substantive difference between these worksheets and those in Database workbook 17 is that NC3, the equivalent of the DB3 module, is de-activated in the analysis of new clients. DB3 is primarily used to demonstrate the correlation between the Tool's 11 predicted behaviors and those that have been observed for the companies that comprise the data set. Since new clients will not become a part of that data, there is no need to show such a correlation. From a functional viewpoint, the greatest change to the calculations occurs in NC4, which is the equivalent of the DB4 module. Here, the coding has been modified so that data can be compared to the parameters in Calculations without actually being exported, as will be further described below.

Figure 10A:
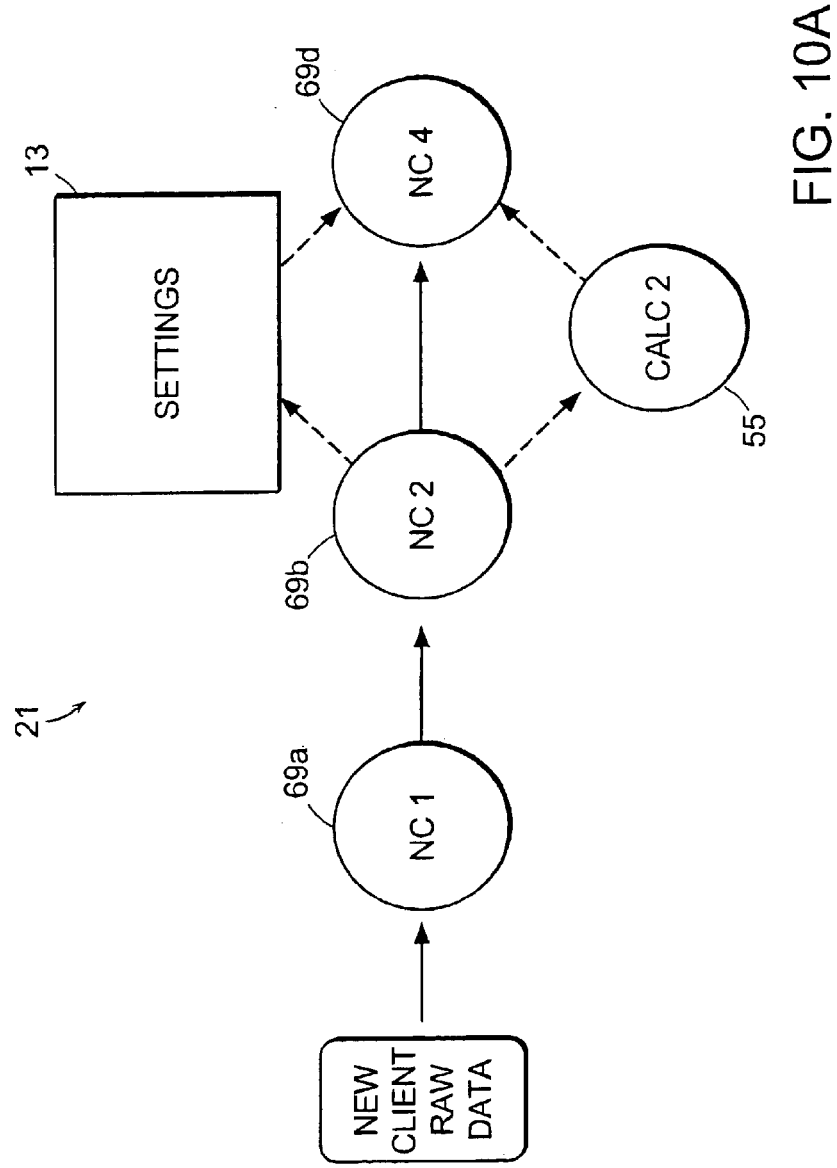
FIG. 10A is a flow diagram showing the flow of information among each of the relevant modules during analysis of a subject company.

FIGS. 10A–10C illustrate the preferred embodiment of new client analysis 21. As shown in FIG. 10A, New Client raw data is entered into first module 69a called NC1. NC1 is the lower part of New Client Worksheet 42a of FIG. 10C. NC1 compiles the relevant company information to be used in second module 69b, NC2. NC2 calculates the chosen series of predictive variables at 27 (FIG. 10B) from the data in NC1. In particular, from the raw data entered into NC1, NC2 calculates the values for the determining factors 27 in NC2 (FIG. 10B).

Returning to FIG. 10A, the data in NC2 is compared against the ranges set out in the Calc.2 module 55 of the Calculations workbook 15. Based on the comparison, NC4 (module 69d) assigns a threshold and/or interval (e.g., "low, medium, high") value for each factor 27 (FIG. 10B) in NC2. NC4 assigns weighted values for each interval based on the parameters established in Settings 13. From this data, it calculates recommended percentages for growth along the three growth categories 29: reenergizing the core, exploring adjacent businesses, and driving business transformations.

Figure 4:
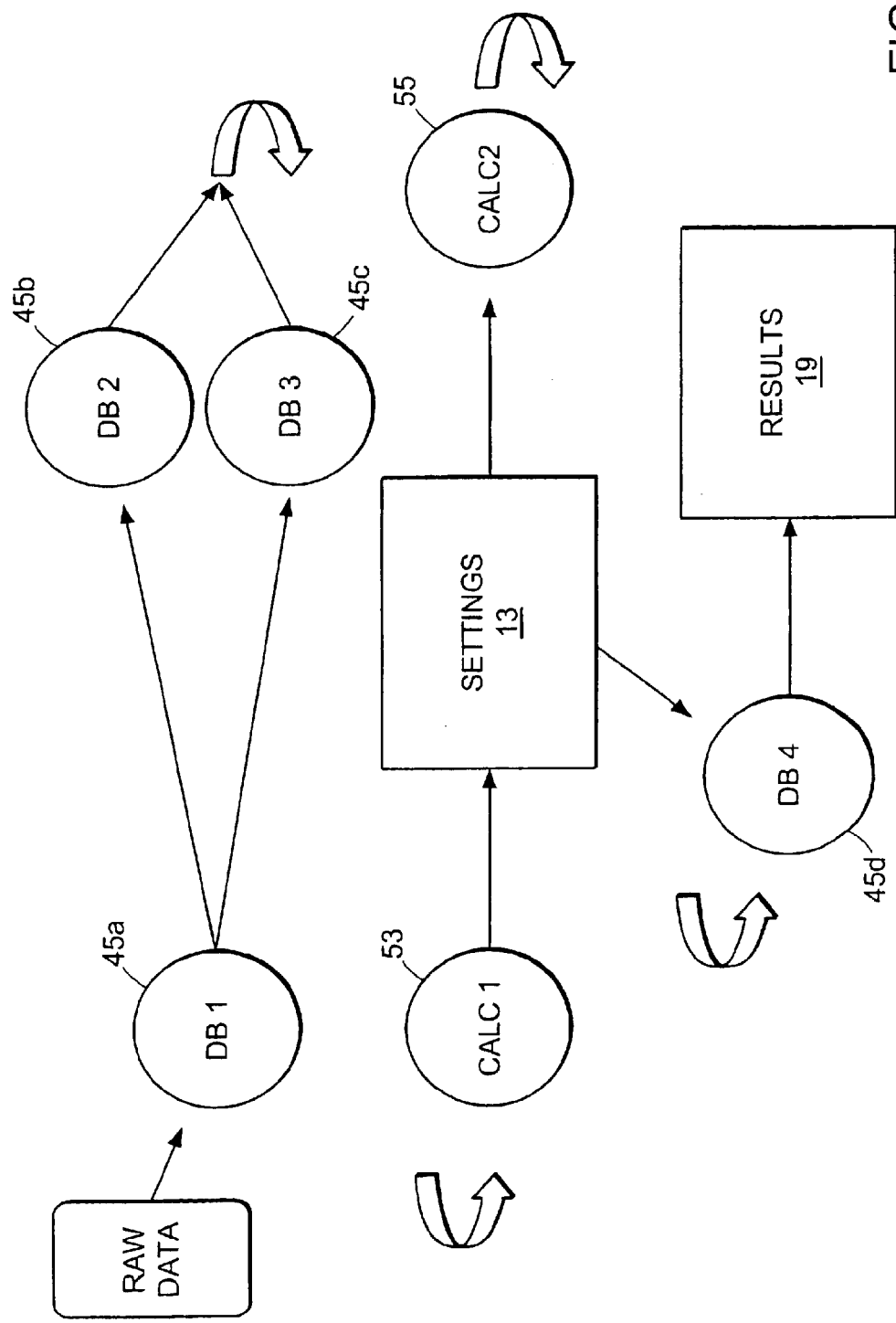
FIG. 4 is a flow diagram of the operations of the FIG. 1 embodiment.

WORKFLOW DRAWING. FIG. 4 is a flow diagram showing the movement of information among each of the relevant modules and workbooks 13, 15, 17. This drawing illustrates how the Tool 11 has been built as well as how it has been used to compare predicted and actual strategies for the one hundred companies being examined.

As FIG. 4 indicates, the first input to the Tool 11 is selected data from one hundred successful growth companies into DB1 (module 45a). In the preferred embodiment, outside consultants may enter client data into the Tool 11 that replicates the calculations being made therein.

As the data is entered, DB2 and DB3 (modules 45b and 45c) apply specified algorithms to calculate values for each of the key variables 27. Each calculation occurs as data is entered. For the sake of clarity, this description will proceed vertically from top to bottom through DB2 (module 45b of FIG. 6A).

Section A of DB2 contains three key business parameters (at 27). Market Share/Revenue Ratio is calculated by dividing the annual change in market share (as a percentage) by the change in annual revenues. If both figures are negative, then this value is multiplied by negative one to produce a negative result.

Throughout this description, Applicant follows Colgate-Palmolive Company ("C-P") as an illustrative example. The database worksheet 42a for this company is illustrated in FIGS. 9A–9B and corresponds to the following discussion. In this case, C-P's ratio is calculated in cell F7 of the respective company worksheet 42a (FIG. 9A) as: $(((11.44\%-11.51\%)/11.51\%)/((9118.2-8971.6)/8971.6)) = -37.22\%$.

Asset Intensity (or Asset/Revenue Ratio) is calculated by dividing assets by annual revenues with the provision that if revenues are zero, the formula returns "N/A" and this figure is excluded from all remaining calculations. This protection against error values is contained in each of the algorithms utilizing a mathematical division operation in the Tool 11. In the present example, this is calculated in cell F8 of worksheet 42a as $7,423.1/9,118.2 = 0.81$.

Change in Profitability calculates the average change in the company's ratio of net income to revenues over a period of two to four years, depending on the availability of the data. The algorithm is designed so that if data is available from four years ago, then the division is based on those four years. If the data is available from three years ago, but not four years ago, then the division is based on those three years. If data is available for two years ago, but not three years ago, then the division is based on those two years. In the present example, four years are used and cell F9 of worksheet 42a (FIG. 9A) calculates this as follows:

$$(((937.3/9118.2)-(848.6/8971.6)+(848.6/8971.6)-(740.4/9056.7)+(740.4/9056.7)-(635/8\ 749))/3)=0.010.$$

Section B of DB2 includes four measures of funding strategy and/or risk (at 27 of FIG. 9A). Company Beta is a measure of responsiveness to market volatility. This factor is currently inactive but could factor into future predictive algorithms.

The Debt/Equity Ratio divides the Debt Outstanding of the company by its Shareholder Equity. If the company has no Shareholder Equity, then the program returns "N/A," and the calculation is excluded. In the present example, this is calculated as $2582.2/1833.7 = 1.41$.

The Creditworthiness of the company is calculated by adding the sum of its Net Cash from Operating Activities (divided by 1000) plus the difference between that measure and its annual Interest Paid, divided by its annual revenues and multiplied by a factor that varies depending on the age of a company relative to a threshold business age factor set in cell F25 of the Thresholds Fixed sheet 39 (FIG. 5F) of the Settings workbook 13. In the preferred embodiment, the threshold between established firms and newer ones is set at seven years. From conversations with numerous professionals involved with the analysis of private equity and bond issuances, Applicant has determined that well-established firms are generally regarded as having credit that is superior to that of new firms. To account for their enhanced credit status, companies older than seven years are multiplied by a factor of 1.1, while those seven years or younger are multiplied by 0.9. This adjustment is built in to recognize the enhanced creditworthiness that comes to long-established companies. In FIG. 9A of the present example, this is calculated as $((1292.7/1000)+(1292.7-171.6)/9118.2)*1.1 = 1.56$.

A Cash Flow/Revenue Ratio is calculated by dividing the client's Net Cash from Operating Activities by its annual revenues. If annual revenues equal zero, the formula returns "N/A" and this factor is excluded from the calculation. In the present example of FIGS. 9A and 9B, this is calculated as $1292.7/9118.2=0.14$.

Section C of DB2 measures three market indicators (at 27). Relative Market Share is a comparison of the company's annual revenues to that of its largest competitor. In the C-P example, this is calculated in cell F16 of FIG. 9A as $9118.2/39,740=0.23$.

The Change in Market Share calculates the growth or decline in market share as a percentage between the last two years. If the company had zero market share in the previous year, this again is displayed as "N/A" and excluded from further calculations. For the C-P example of FIGS. 9A and 9B, this is calculated as $(11.44\%-11.51\%)/11.51\% = -0.61\%$.

Relative Elasticity of demand is the average of the elasticity of each of the Standard Industry Classifications (SIC) that the company is involved with. In the example, cell F18 (FIG. 9A) calculates this as $4.0/2.0=2.0$. This variable is excluded from the ultimate calculations in the preferred embodiment but may be used in other embodiments.

DB3 contains seven of the key variables 27 that are designed to track the actual growth strategy of each company comprising the dataset of the Tool 11. This data is used to establish the correlation between the growth strategies that were predicted by the invention 11 and those that have actually been implemented by the companies being observed. In future permutations of the invention 11, similar calculations may be used to contrast the current behavior of a company with that recommended by the Tool 11. Such a measure might be useful to demonstrate the amount of strategic change required to implement the recommendations of the Tool 11.

Business Mix (at 27) is a measure of growth within various identifiable areas, be they geographic regions or segments of the company. This represents an important measure of actual company behavior, as such growth is indicative of growth into adjacent areas. The calculation contained here extracts the greatest percentage growth in revenues or assets of the company's regions or segments between the past two years. In the Colgate-Palmolive example of FIG. 9A, this is the 5.64% growth in revenues between 1998 and 1999 in C-P's pet nutrition division, which is listed in the data module 45a (FIG. 9B) as Business Segment 2.

Business Age is simply the age of the company in years. This variable currently uses the year 2000 as a base, and is understood to be updated annually.

Number of Divisions is the number of separate business segments within the company's annual report.

Number of SIC Industries indicates the number of separate markets in which the company operates. This important measure of type of growth strategy is easy to overlook as it is not included in annual reports. The Applicant includes it here as an indicator of a company's existing efforts to compete in a multitude of markets.

Although listed with the other factors in DB3, Acquisition Strategy and Strategic Intent are actually tabulated outside of the Tool 11, with the result stored in DB1 for further calculation in DB4.

Returning to FIG. 4, as mentioned earlier, the data from DB2 and DB3 flows into the Calculations workbook 15. This information is ultimately stored in the All Factors sheet 49 (FIG. 7B), but is first used in the Calc.1 module 53. Calc.1 pulls the information for the relevant factor from each of the 100 companies included in the Tool 11. Calc.1 arrays each of these from low to high value, but scores those that have been turned off as "False."

For example, in sheet I.B4 (worksheet 51b, FIG. 9C) the Cash Flow/Revenue ratio is being analyzed. In this instance, the lowest value is that of SPEEDUS.com, which has a ratio of -11.21 and is listed as the first company from the left (starting in column G). Colgate-Palmolive, of the present example, has a ratio of 0.14 and is therefore located much further to the right (column BM). This data in Calc.1 (module 53 of FIG. 4) provides the initial threshold levels for determining Interval values. Those values are later adjusted based on the interim results of the analysis and the accumulated knowledge of those setting the values. Certain companies have been "turned off" in DB1, and therefore are listed as "False" in worksheet 51b.

As mentioned previously, the Settings workbook 13 establishes the parameters by which all of the information in the Tool 11, including new client data, is to be evaluated and categorized. The only direct link of information into the Settings workbook 13 is from the Results file 19. Four worksheets—Thresholds Percentile 37, Thresholds Fixed 39, Scoring 35, and Intervals 25—each import two factors from the Results file 19 measuring the accuracy of the Tool 11. The average absolute variance and the overall correlation factors are shown in the upper left section of each sheet 25, 35, 37. These references are used to further refine accuracy of tool 11. As each factor is adjusted, the overall effect on the Tool 11 is determined almost immediately. This capability has allowed Applicant to fine tune the invention to achieve a high degree of correlation between predicted and actual behavior of successful growth companies.

Based on the criteria established in the Settings workbook 13, the next action occurs in the Calc.2 module 55 as illustrated in FIG. 4. Calc.2 begins its tabulations with a check to see whether a company should be included in the analysis. This factor has been set in cell P1 of each of the individual company worksheets 42 (FIG. 7A) of the Database workbook 17 and is stored in the All Factors sheet 49 (FIG. 7B) of this workbook. If the check of that reference returns a "No," then the company is coded as "N/A" and excluded from the remainder of the calculation.

When that check returns a "Yes," several more steps are taken. Each company's score is referenced against the set of determinants contained in the range A10:P16 on the company's worksheet 42. These cells have created specified ranges and values using inputs from Calc.1 and the Valid Arguments 32 (FIG. 5C), Factors and Strategies 38 (FIG. 5G, and Intervals 25 (FIG. 5A) worksheets of the Settings workbook 13. The primary function here is determining the actual cut-off values for percentile intervals that have been defined in the Settings workbook 13. The algorithm determines the actual threshold values by multiplying the count of active companies being analyzed by the threshold percentiles that have been determined. It then selects the appropriate actual values, from those enumerated in row 6 of Calc.1 (module 53, FIG. 7A), to set the bounds of each interval. Each company's subject factor 27 value is compared to these intervals and is placed into the appropriate interval category (low, medium, high) based on its numerical score calculated for that factor 27. Each interval has been assigned a valid name or score in the Settings workbook 13.

This name then is selected and listed in the corresponding cell in row 8 of subject factor worksheet 51. These references are compiled in the All Factors worksheet 49 for use in other sections of the Tool 11.

Figure 9C:
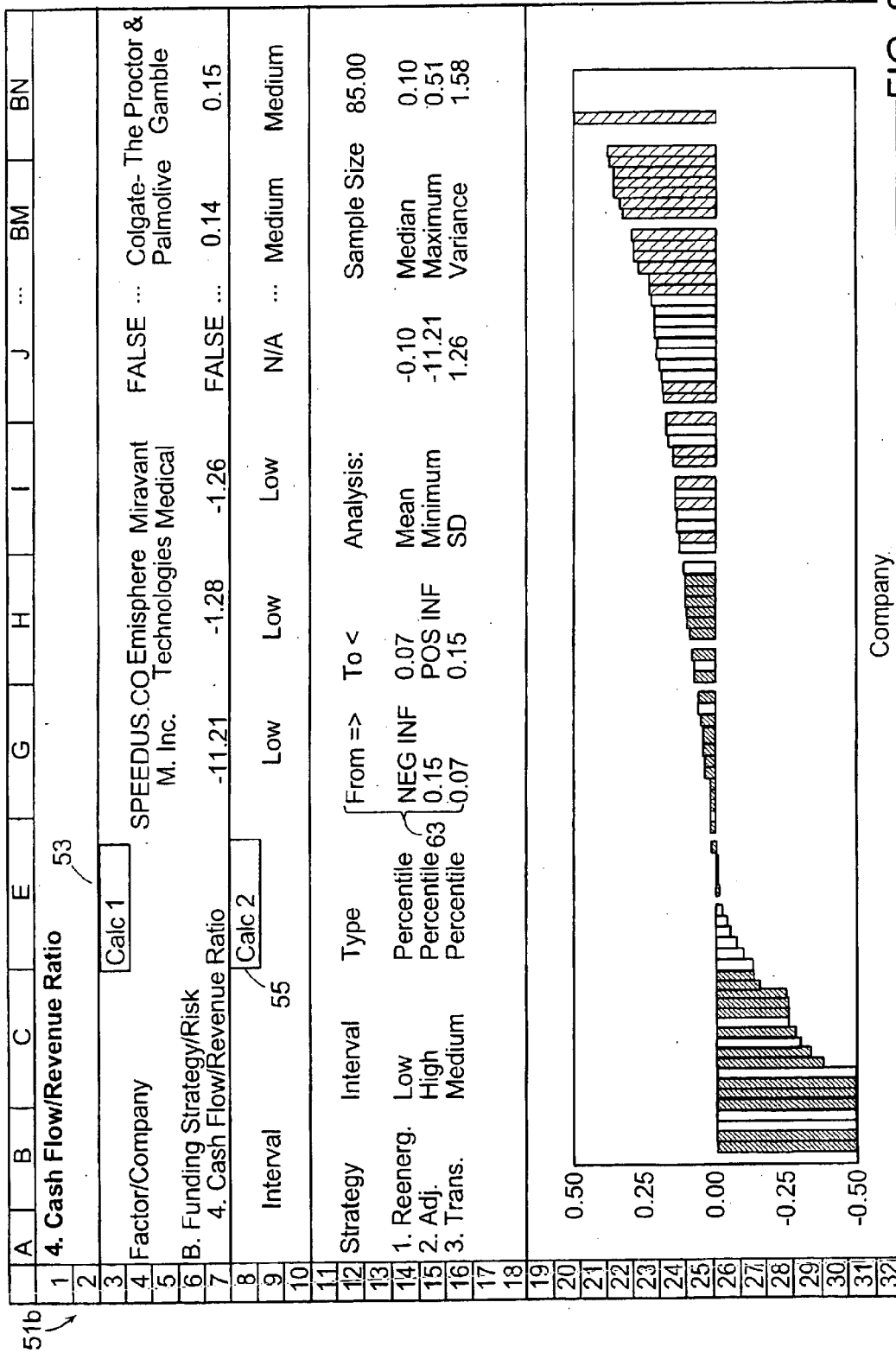

Take the situation of Colgate-Palmolive in the Cash Flow/Revenue worksheet 51b (FIG. 9C). As determined in Calc.1, C-P had a cash flow to revenue ratio of 0.14 and was placed in column BM. C-P's ratio is compared against the three intervals defined in G13:H15 (block 63, FIG. 9C). These intervals were calculated according to the parameters established in cells of the Thresholds Percentile worksheet 37 (FIG. 5E) corresponding to the subject key factor/key value 27. These stated that companies up to the forty-fifth percentile would be designated as "Low," and that those in the sixty-fifth percentile or above would be considered "High." Counting only the companies that were turned "on," the Calculations workbook 15 determined the numerical values for the bounds. The C-P cash flow/revenue ratio of 0.14 is compared against the first, or the "Low" range: greater than or equal to negative infinity, but less than 0.07 shown at 63 in FIG. 9C. C-P's ratio is greater than this range, so it is compared to the second range: greater than or equal to 0.15, less than positive infinity. The 0.14 ratio of C-P is too low for this range, so it is compared to the third range: greater than or equal to 0.07, but less than 0.15. C-P's ratio is within this range, so it is assigned the corresponding value (low, medium or high) for this range, as listed in the same row at column C of FIG. 9C, or "Medium". This is the interval value (Medium) that is shown in cell BM8 of FIG. 9C.

Returning to FIG. 4, the next set of algorithms is exercised in the DB4 module 45d. This is the point in the workflow at which a company's opportunities for growth are statistically determined. DB4 draws information directly from DB1 module 45a, Calculations workbook 15, and Settings workbook 13 as shown in FIG. 6A. The recommended growth strategy categories 29 are determined in the top half of the module 45d (as discussed in the preferred embodiment of FIG. 6A). On the lower half of the DB4 module 45d, comparative actual strategies for those companies comprising the base data are also calculated as will be described shortly.

For each of the key variables 27 measured in DB2 (module 45b), the interval values assigned in Calc.2 are imported and listed in column J of FIG. 6A. For each interval value, DB4 imports the corresponding numerical value for each growth strategy category 29 as determined in the Intervals and Scoring worksheets 25, 35 (FIG. 5A and 5D) of Settings workbook 13. These weighted values range from 200 points for Market Share to zero for Elasticity of Demand, which has been effectively taken out of the calculation. The lowest weight for an active factor is 25 points, which has been assigned to several variables. These values are then summed by column (i.e., growth strategy category 29) into raw scores in row 21 of FIG. 6A. These rows are summed across into cell P21 of FIG. 6A. In the preferred embodiment, this total should be 750 as each variable's weight is scored equally for each growth strategy category 29. An exception would occur if a company had received "N/A" as a score on any key variable 27. No such occurrences exist in the preferred embodiment, but could exist in the future adjustments to the model 23. Should other predictive factors be introduced into the invention, this total would likely be adjusted to accommodate them.

Based on these scores in row 21 of FIG. 6A, the company's predicted growth strategy in percentage amounts of reenergize, adjacency and transformation is listed in the range L20:O20 of FIG. 6A. These scores predict how a company should have weighted its focus among the three growth strategy categories 29 to produce maximum profitable growth. The sum of the percentage amounts must equal 100%.

Once again, take Colgate-Palmolive as an example. As determined earlier, C-P's Cash Flow/Revenue Ratio of 0.14 falls within the "Medium" interval. Checking the Intervals sheet 25 (FIG. 5A) of the Settings workbook 13 (in cell G16) a Medium score on this key variable 27 correlates with the Transformation growth strategy. Moving on to the same cell of the Scoring worksheet 35 (FIG. 5D), this value has been assigned a weight of 25 points. This value is imported to cell O14 of the C-P worksheet 42a (FIG. 9A) of the of Database file 17. A similar process occurs for each of the other key variables 27. Each of these scores is then summed per category 29 and divided to determine percentage mix of strategy categories 29 as described above. This produces a recommended strategy/growth plan that is weighted 60.00% toward Reenergizing the Core, 33.33% toward Adjacencies, and 6.67% toward Transformations.

On the lower half of the DB4 module 45d (FIG. 6A) are the observations of actual company behavior. These are used to show the correlation between the predictions of the Tool 11 and the actual behavior of successful growth companies that comprise the data set.

The first five of these actual factors 27 (Business Mix, Business Age, Number of Divisions, Number of SIC Industries, and R&D Investment) are scored similarly to the predictive determining factors 27. The one notable difference is that each factor in this section has a weight that varies according to its corresponding growth strategy (category 29) to account for its specific relevance toward that strategy. Some factors have a single extreme behavior that is clearly indicative of a specific category 29. For example, high R&D spending indicates an ability to pursue a Transformational strategy. Others, like low and moderate R&D spending, do not of necessity correspond to one of the two remaining strategies more so than the other. In these instances, the single extreme category receives a weighted numerical score of greater than zero, and the other two categories are assigned matching scores, which may be zero.

Alternatively, some factors may have two equally relevant growth strategies. In these instances, those two factors receive equal positive weights, while the third factor is set to a lower figure, which may be zero. For example, having a low number of divisions correlates well with a strategy that focuses on reenergizing the core, while having a high number suggests an ability to pursue adjacencies. In the preferred embodiment, each of these categories receives a positive weighted score, while transformation is set at zero since there is no corresponding interval value. Following our example, C-P's Business Age falls into the High category shown in FIG. 9A. This measure scores a zero on the Scoring sheet 35 of the Settings workbook 13 and appears as a blank in DB4 (FIG. 9A). On the other hand, C-P's Number of Divisions falls into the low interval, which is worth 25 points in the Reenergize category. The figures are reflected in cells L28 and L29 of FIG. 9A.

The two remaining key variables 27 are Acquisition Strategy and Strategic Intent. The scores for these components are still partially determined by the weighted values in the Settings workbook 13, but also factor in the original percentage values that were recorded in DB1, cells P46:54 (FIG. 6B). The percentage value for each factor in DB1 is multiplied by its corresponding weight in the Scoring worksheet 35 (FIG. 5D). This calculation produces the values displayed in cells L33:O34 of FIG. 6A. The remainder of the calculation (summing columns per category 29 and determining relative percentages) is performed as above to determine the actual strategy category mix employed by the companies.

Referring to FIG. 9B, in the case of C-P, its Acquisition Strategy 43 was calculated to be split 50/50 between Reenergize and Adjacency strategies. In the Scoring worksheet 35 (FIG. 5D), Applicant has determined that the intervals representing Acquisition Strategies geared wholly toward Reenergizing should be worth 112.5 points. Those focused on adjacencies would be worth 75 points. Since C-P divided its efforts evenly between these two strategies, it was given half of the possible points for each of these two components of Acquisition Strategy 43. Thus C-P's worksheet 42a (FIG. 9A) includes Acquisition Strategy scores of 56 (as appears in cell L33) for Reenergize, and 38 for Adjacency (cell N33).

The strategy intent 47 scores are similarly calculated using scoring worksheet 35 (FIG. 5D) and percentage indications per category 29 at 47 in FIG. 9B. Totals per column and percentage mix therefrom are calculated as discussed above.

The outcomes from each company's individual predictive and actual scoring are compiled in the Results workbook 19 (as shown in FIG. 4). The purpose of this workbook 19 is to demonstrate the correlation between the predicted strategies for successful growth companies (as determined by the Tool 11) and the actual behaviors that have been demonstrated. New client data will not be entered in this workbook 19.

The Strategy Table 71 (FIG. 8) of the Results workbook 19 extracts titular information from the Settings workbook 13, but draws its data from the Database workbook 17. The first reference in this worksheet 71 is drawn into row six (labeled "Analyzer" in FIG. 8) from Database workbook 17 and is the determination of whether to include a company in the analysis. If the reference returns a negative answer, the analysis ceases and the companies that have been turned off are excluded from further analysis. If answer comes back in the affirmative, then the worksheet 71 draws in data from two arrays in DB4, L20:O20 and L36:O36 of FIG. 6A. These data arrays describe the recommended and actual strategy category mix (distribution among categories 29), respectively, as produced in DB4 (module 45d, FIG. 6A).

In order to determine the accuracy of predictions for the behavior of each company, predictive and actual results are compared for each component of the growth strategy. The goal of these comparisons is to demonstrate that the companies being studied have largely followed the growth avenues that would have been recommended by the invention.

In strategy table 71, the actual results for each component are subtracted from the predicted results (i.e., actual Reenergize is subtracted from predicted Reenergize, etc.). The absolute value of each variance is taken and the average of the three differences appears in row 18 (labeled "ABS DIFF"). Since the absolute value of each variance is used, the average differences will all show as positive numbers.

With reference to FIG. 9E, taking Colgate-Palmolive as the test case once again, one sees that their predictive and actual values have been imported from DB4 (FIG. 9A), beginning in cell AC9 with a predicted Reenergize score of 60.00%. The differences of its variances has been calculated by taking the average of the absolute values of (60.00%–58.89%), (33.33%–31.58%), and (6.67%–9.53%) to produce an average variance of 1.9111% in C-P's strategy table 71a (FIG. 9E).

Once each company has been scored, the Strategy Table 71 (FIG. 8) calculates the correlation (or R-squared) of predicted and actual behaviors by growth strategy category 29. For Reenergize, cell C21 calculates the correlation between each of the predicted and actual values. The two cells beneath it perform similar functions for Adjacencies and Transformations. This produces correlations (as shown in these cells) ranging from 0.58 to 0.69 depending on the component. This demonstrates that the successful growth companies being analyzed by the Tool 11 have largely followed paths similar to those that would have been recommended by the invention. The presence of such a correlation confirms the reliability of the invention's outputs.

The final function currently contained in the preferred embodiment of the Tool (cell C25) takes the average of the preceding three correlations as shown in FIG. 8. This demonstrates that the invention has an overall correlation between predicted and actual values of 0.64, which should be considered a good outcome for the quantification of behavioral information.

NEW CLIENT ANALYSIS. As previously mentioned, the New Client Analysis 21 (FIG. 1) consolidates some algorithms of the Database 17 and Calculations 15 workbooks. The number of worksheets contained therein will vary depending on the number of new clients being analyzed, but each one will appear similar to the individual company worksheets 42 contained in Database 17.

In most respects, the analysis of new client data will be similar to that of the one hundred companies in the Database workbook 17. Each Database module 45 has its equivalent component with a matching numerical designation in New Client Analysis (i.e., DB1~NC1). In NC1, the data selection and algorithms are the same as in DB1, except for Acquisition Strategy and Strategic Intent. Since the preferred embodiment of the invention will not be comparing actual data to predicted data, there is no need to calculate these factors. This data will be calculated in NC2 exactly was done for the companies in DB2. The actual calculations in NC3 will not be performed, as their output is unnecessary for the remainder of the analysis. The substantial variances in the analysis occur in NC4.

The Intervals column of DB4 imports data from the individual factor worksheets 51 (FIG. 7A) of the Calculations workbook 15, via the All Factors worksheet 49 (FIG. 7B). Information extracted in this fashion, must first appear in the Calculations workbook 15, and therefore will be included into the data analyzed in that file as previously described. The New Client Analysis workbook 21 was designed to prevent this contamination of the data.

Rather than create whole new algorithms for analysis, NC4 determines intervals in the array J7:18 (FIG. 10B) by comparing them to against the Calculations data, but not actually exporting any information. Instead, the algorithms that Calc.2 (module 55, FIG. 7A) uses to assign interval values have been electronically imported into the New Client worksheets. Since these have been imported electronically, they will automatically update any time the Tool 11 itself is updated.

A comparison of two modules will further describe the relationship. DB4 (FIG. 6A) draws in interval values by first matching the name of the company to one listed in All Factors 49 (FIG. 7B). It then goes to a specified cell corresponding to the relevant factor 27 being examined and imports the value listed there. Going back to the example of Colgate-Palmolive and the Cash Flow/Revenue Ratio, cell J14 of Database worksheet 42a (FIG. 9A) drew in the value contained in cell BD16 of the All Factors sheet 49a (FIG. 9D). That cell drew its data from cell BM8 of sheet I.B4 (worksheet 51b of FIG. 9C), which calculated an interval by comparing the value in cell BM6 against the values in the array 63 including G13:H15 (FIG. 9C). The value in cell BM6 was imported from All Factors worksheet 49a cell BC16 (FIG. 9D), which was drawing its data from cell F14 of the DB2 module 45b of worksheet 42a (FIG. 9A) of the Database workbook 17.

NC4 imports the calculations contained in row 8 of each factor worksheet 51 (FIG. 7A) into column J of the client worksheet 42b (FIG. 10B). This calculation was previously described under Calc.2 module 55 (FIG. 7A). For the same example, NC4 imports the calculation contained in row 8 of worksheet 51 of Calculations 15. This calculation compares the data in NC4, cell F14 against the array G13:H15 of worksheet 51 (FIG. 7A), instead of passing cell F14's data through several different links. This allows the client's data to be assigned an appropriate interval value.

Once the interval values have been assigned, the algorithms in NC4 proceed like those in DB4 (module 45d, FIG. 6A), turning these values into growth strategy or plan recommendations. Since the actual values in NC3 were not calculated, those factors will also not be calculated as actual growth strategies.

Once the proposed growth plan (with respective percentage distribution among the Reenergize, Adjacency and Transformation categories) is defined, two separate outputs are produced. The first output is a graphical profile that is organized around growth strategy focus. Each company analyzed will fall into one of the following five profiles: Reenergize & Adjacency Focused, Transformation & Adjacency Focused, Transformational, Mainly Adjacencies, and Unparalleled. These profiles provide a client with a comparison group of other companies that have successfully implemented similar mixes of growth strategy. These outputs give a client a context beyond the raw figures in which to consider the Tool's 11 recommendations.

The other output is a set of implementation guidelines. Reported and estimated data on a set of companies that have implemented a variety of successful growth strategies has been compiled and sorted by growth strategy. This data is used to provide a new client with general parameters regarding the dollars, time and manpower that typically need to be invested to implement the growth strategy mix that has been recommended by the Tool 11. A similar exercise is performed to indicate the general scope of outputs (in terms of revenues and profits) that may be obtained by implementing each strategy. These guidelines are currently scaled toward a company with one billion dollars in annual revenues. The size of the client has a direct bearing on its ability to implement a new growth strategy, so it is necessary to adjust this measure to fit each new client.

According to the foregoing discussion, the new invention Tool 11 effectively determines an optimal quantitative growth plan (with percentage distribution among Reenergize, Adjacency and Transformation plan components) for a given company. Using this plan and other accumulated data, general guidelines regarding the scope of necessary inputs and potential outputs are produced. Such quantitative determinations, especially from qualitative company data sources, were heretofore unachieved by prior art systems and services.

STRATEGIC SELF DIAGNOSTIC. The inventor has also created a simplified version of the New Client Analysis workbook 21, which is referred to as the Strategic Self Diagnostic (or Paper Diagnostic). This version of the Tool 11 may be used by clients seeking future growth. This version has been developed based on the parameters similar to those in the electronic version of the preferred embodiment. This diagnostic tool has been created in several media, including Microsoft Excel, Microsoft PowerPoint, and in paper form. This diagnostic may also be posted on the inventor's Internet site for use by potential new clients. This Internet-based version of the Tool 11 may either specifically enumerate calculations to be performed by potential new clients, or may perform calculations itself using the data input by said potential clients.

The analysis performed by the Paper Diagnostic is closely related to the electronic version, although somewhat less detailed. It allows a potential client to perform a quick self-analysis with results that are generally similar to the electronic version. Like the electronic version of the Tool 11, the Strategic Self Diagnostic scores a company's growth potential along the Reenergize, Adjacency, and Transformation categories/components 29. Unlike the electronic Tool 11, there are not multiple calculating modules contained in this diagnostic. Rather, all of the calculations appear on the two-page worksheet. All of the thresholds are established and shown on the analysis sheet.

The first question this version asks is whether a company's profitability (net income/revenues) has shown significant change over the past two years. This factor is the rough equivalent of the Change in Profitability determining factor 27 of the NC2 module 69b (FIG. 10B) in the electronic version. Significant change is defined in this case as movement of greater than 5%, and is calculated as follows:

Profitability Calculator (in Millions of)

$$\left( \frac{\text{Net income, most recent fiscal year:}}{\text{Revenues, most recent fiscal year.}} - \frac{\text{Net income, previous fiscal year.}}{\text{Revenues, previous fiscal year}} \right) \div \frac{\text{Net income, previous fiscal year.}}{\text{Revenues, previous fiscal year}} = \_\_\_\%$$

\*\* Subtract previous net income/revenues from most recent net income/revenues, then divide result by previous net income/revenues Fifteen points are associated with this variable. A company with an increase of 5% or more would receive these points in the Adjacency growth category. One with a decrease of 5% or more would receive the points in the Transformation category. While a company whose revenues are not showing significant change would be credited with 15 points in the Reenergize category.

The second variable being measured in the Strategic Self Diagnostic is the relationship between the firm's asset base and revenues for the most recent fiscal year. This factor is the rough equivalent of the Asset Intensity component of the NC2 module 69b (FIG. 10B) in the electronic version. A ratio of greater than 3:1 is considered high and earns the company five points in the Reenergize category. A ratio of at least 1:1 but less than 3:1 is in the medium range and scores five points for Adjacencies. An analysis showing assets as less than revenues is considered low, and scores five points for Transformational growth.

Next, this Diagnostic measures the company's change in market share growth over the past two years. This factor is the rough equivalent of the Change in Market Share determining factor of the NC2 module 69b (FIG. 10B) in the electronic version. Significant change is defined in this case as movement of greater than two percent and is calculated as follows:

Market Share Calculator (in Millions of Dollars)

(Market share is your revenues ÷ overall industry revenues)

$$\left( \frac{\text{Revenues, most recent fiscal year:}}{\text{Industry revenues, most recent fiscal year:}} - \frac{\text{Revenues, previous fiscal year}}{\text{Industry revenues, previous fiscal year.}} \right) \div \frac{\text{Revenues, previous fiscal year:}}{\text{Industry revenues, previous fiscal year.}} = \underline{\quad}\%$$

** Subtract previous revenues/industry revenues from most recent revenues/industry revenues, then divide result by previous revenues/industry revenues Twenty points are associated with this variable. A company with an increase of two percent or more would receive these points in the Adjacent growth category. One with a decrease of two percent or more would receive the points in the Transformation category. While a company whose ratio is not showing significant change would be credited with twenty points in the Reenergize category.

The next variable to be analyzed is the relative relationship between the firm's growth in market share and its growth in revenues over the past two years. This factor is similar to the Market Share/Revenue ratio of the NC2 module 69b (FIG. 10B). This factor measures whether a company has been keeping pace with the growth in its current industry. This is calculated as follows:

Market Share/Revenue Calculator (in Millions of Dollars)
Use company and industry revenue numbers from Question 3.
Divide most recent company and industry revenues,
and enter here:

$$\frac{\dfrac{\text{Revenues, most recent fiscal year:}}{\text{Industry revenues, most recent fiscal year:}} - \dfrac{\text{Revenues, previous fiscal year:}}{\text{Industry revenues, previous fiscal year:}} \div \dfrac{\text{Revenues, previous fiscal year:}}{\text{Industry revenues, previous fiscal year:}}}{(\text{Revenues, most recent fiscal year} - \text{Revenues, previous fiscal year}) \div \text{Revenues, previous fiscal}} = \underline{\quad}\%$$

** Subtract previous market share from most recent market share and divide by previous market share. Do the same for revenues, then divide the two results.

A company with market share growth of at least 50% of its revenue growth is positioned to drive Transformational growth and receives fifteen points in this category. NC2 calculates the chosen series of predictive variables at 27 (FIG. 10B) from the data in NC1. A firm with market share growth between −3% and 50% of its revenue growth correlates with a strategy of exploring Adjacencies. For a company receiving a score of less than −3%, the fifteen points are credited to the Reenergize category.

Next, the Paper Diagnostic directs the firm to measure its revenues relative to the largest competitor in its industry. This is the variable described as Relative Market Share in the NC2 module 69b (FIG. 10B). Relatively small players in a given market, those with revenues that are 15% or less of the largest competitor, receive twenty-five points in the Transformation category as this indicates the need for dramatic change to provide significant growth. Medium size players in an industry, defined as those with revenues that are between 15% and 40% of their largest competitor, are judged as having an ability to grow further within their existing market. They will, therefore, receive a score of twenty-five points in the Reenergize category. Major players in a market, those with revenues that are at least 40% of their largest competitor, are viewed as having their greatest growth opportunities in related markets. They receive the twenty-five points in the Adjacent Growth category.

The sixth variable being measured is the loyalty of the company's customer base. This is measured by the percentage turnover of the firm's customers. Those experiencing low turnover (or high loyalty), which is defined as 10% or less have the potential to serve these customers in related markets. They receive five points in the Adjacency category. Those with high turnover, defined as 50% to 100%, need to deliver new value and receive the five points toward Transformational strategies. Finally, companies with moderate turnover of greater than 10% but less that 50% receive five points toward shoring up this customer base and Reenergizing the Core.

The seventh variable attempts to measure the degree to which value shifts are occurring in an industry. It does so by directing the firm to consider how many of the following statements accurately describe their company and/or industry:

1. My customers are defining value very much differently than before. (Example: telecom with customers emphasizing price over availability.)
2. I see a very significant shift in how my firm derives its revenues. (Example: a car dealer that used to make most of its revenues from new cars now sees its revenues come mostly from servicing/maintaining vehicles.)
3. My industry has shifted or is shifting its operating model to something never seen before. (Example: travel agency now conducting most business online instead of in person.)

If a firm believes that any of these three statements applies to its situation, then their firm and industry are experiencing a value shift. To produce growth, this firm should attempt to Drive Market Transformations, so they receive ten points in the Transformation category. If none of these statements apply, then there is not a clear need for transformational growth. The inapplicability of these statements does not necessarily indicate a bias toward either one of the remaining two growth strategies over the other. Therefore, the ten points for this variable are divided evenly between Reenergize and Adjacency.

The final variable in the Strategic Self Diagnostic recognizes that there are some growth strategies that tend to work better in certain industries. Software, biotech, and retail are singled out here. The software and biotech industries tend to experience dramatic shifts in value and structure. Therefore, firms in either of these industries should weight their strategies more heavily toward Adjacent and Transformational growth. To factor this into the diagnosis, companies in these industries receive two points for Adjacencies and three for Transformations. In the retail sector, firms tend to be well positioned to offer a greater variety of products to their customers or to expand their product delivery to greater groups of customers. Therefore, their strategies should be more heavily weighted toward Adjacencies. In this Paper Diagnostic, retail firms receive four points for Adjacency and one point for Reenergize. Finally, companies that do not participate primarily in one of these industries are awarded one point for Transformation, and two points each for Reenergize and Adjacency. The distribution of these five points is intended to approximate the average strategy mix recommended for companies used in the Tool 11. This distribution may be changed in future iterations to correspond to changes in the average strategy mix produced by the Tool 11.

Finally, the firm is directed to total each of their scores, producing raw totals for Reenergizing the Core, Adjacent Growth, and Transformation. Since the points have been allocated so that they will always total one hundred, these raw scores are also the percentage scores and correspond to the scores tabulated in the NC4 module 69*d* (FIG. 10B). These scores represent the recommended distribution that a company should apply to the subject growth strategy categories 29.

While the invention has been particularly shown and described with reference to a preferred embodiment thereof, it will be understood by those skilled in the art that various changes in form and details may be made therein without departing from the spirit and scope of the invention as defined.

In the preferred embodiment, the Tool is a set of four Microsoft Excel 97 workbooks with several layers of linked information. The scope of the invention would not be changed if the structure were altered. The five workbooks could be combined or divided to produce differing numbers of workbooks. Similarly, the specific number of worksheets in each workbook is not material to the functioning of the Tool.

The invention could be created in other software programs designed to organize and calculate copious amounts of data. Microsoft Access, Lotus 1-2-3, and other versions of Excel are examples of other off-the-shelf software options that would likely work. Of more importance are the particular algorithms used to provide the data that is derived and shared among the various calculating modules to produce recommended strategies. Each individual algorithm, and all combinations thereof, produce unique outputs throughout the process. Each one is a unique feature of the invention.

The Strategic Self Diagnostic is one example of the variations on the preferred embodiment that should be considered within the scope of the invention. Although the analysis performed in this diagnostic varies in the specific calculations used and the relative weights that have been assigned, it maintains the essence of the original preferred embodiment by using certain quantified variables to prescribe growth strategies based on algorithms developed by the inventor.

In the preferred embodiment of the Tool, a correlative check has been built in to assure that any adjustments further enhance its predictive value. Particular measures have been chosen and named that quantify the qualitative actions of individual companies. Acquisition Strategy and Strategic Intent are two such measures. Their names could be changed without affecting their purpose or the value they bring to the Tool.

Similarly, President's letters have been cited as a source of information for understanding the Strategic Intent and Acquisition Strategy of individual companies. Similar information could be compiled from other sources such as press releases or interviews with senior executives without deviating from the function of this aspect of the Tool. The essence of this aspect of the invention would be equally captured by any attempt to quantify statements of strategic intent by their impact on growth strategies.

In the preferred embodiment, the Tool contains seventeen key variables, with fifteen currently categorized as active. For most of these seventeen variables, there exist related measures that one might use to reach the same conclusion. Substituting related measures to draw the same, or similar, conclusions would not stray from the intent of the invention. The same would hold true for calling the same measures by different names.

Of greater import to the integrity of the invention is the method of using such data to classify growth potential by strategy, which is unique to this Tool. In current art, companies have access to their own data, but no means by which to translate that information into strategic behavior based on the success of others. Perhaps the greatest value of the Tool is the ability to translate seemingly unrelated series of data into strategic direction. It would be understood by one skilled in the art that this component of the Tool distinguishes it from all current and prior art.

In the preferred embodiment, growth strategies are divided into three distinct categories: Reenergize the Core (Reenergize), Explore Adjacencies (Adjacency), and Driving Transformation (Transformation). This concept is an integral and unique portion of the invention. Referring to these basic strategies by virtue of some other name would not deviate from the scope or spirit of the invention. Reenergize could equate with any strategy to improve current performance in a company's current markets. Adjacency could be replaced with any recommendations to explore related markets or to produce next generational products to provide further growth. Transformation could also be replicated by any attempt to re-shape the marketplace, provide a new definition of value for the customer, or to address previously unserved or underserved customers. While the general principle of planning for growth is obvious and well known, categorizing that principle into distinct and definitive categories based on empirical data is unique to this invention.

In the preferred embodiment, the core of the invention contains a data set that has been developed using information about one hundred successful growth companies. Each of these has demonstrated the ability to deliver successful growth, which is essential to the Tool. Other companies with similar characteristics could be used in place of some of the companies included in the Tool without compromising the integrity of the invention or its predictive capabilities.

In the preferred embodiment certain values have been set as thresholds in the Settings workbook. It is expected that the inventor will periodically adjust the values in the Settings workbook to enhance the invention's predictive value. Adjustments will need to be made for several reasons. At a minimum, as new data is made available, the Tool should be updated to reflect current marketplace economics. Also, the list of companies included in the Tool should be periodically reviewed for completeness and relevancy. As new industries develop, or current ones change, the Tool will have to be adapted. Even for the companies included in the preferred embodiment of the inventions, data should be updated on an annual basis to keep the Tool current.

Second, the invention is not attempting to prove a scientific truth. Rather, its primary function is to quantify the qualitative behaviors of organizations. As significant changes are seen in overall organizational behavior, the Tool must be adjusted accordingly. The marketplace in which new clients will compete is highly dynamic and the invention will most useful if it can be adapted to changes.

Additionally, the inventor may need to introduce new factors into the Tool as the marketplace performs its constant transformations. Within the current preferred embodiment, two factors that had been expected to prove relevant have been "turned off," or excluded from the calculations of the invention even though they are shown throughout the invention. Company Beta had been intended to measure the impact of volatility on a company's growth strategy. A successful predictive algorithm has yet to be developed by the inventor for this variable that would enhance the predictive correlation of the Tool. This factor is still being analyzed and may yet be included in the Tool once the proper algorithm is created.

Similarly, the Relative Elasticity of Demand for a company's products was analyzed for its correlation to growth strategy. The inventor had hypothesized that companies with similar elasticity for their products would pursue similar growth strategies. Again, the appropriate algorithm to demonstrate such a correlation has yet to be developed, but is being studied for possible inclusion in the invention at a later time.

Some factors that are not explicitly contained in the current preferred embodiment are also likely to be included in the invention at a later date. For example, the economy's overall shift toward electronic commerce is likely reflected in some of the underlying success of the selected companies. Indeed, approximately one-third of the companies used in the Tool are listed on the Fortune e50 or Deloitte & Touche Technology 500 lists. The inventor is currently studying the inclusion in the Tool of a more overt factor to measure the impact of this market transformation. Such a factor could measure growth in revenue or market share attributable to electronic commerce, product availability over the Internet, utilization of electronic commerce among a company's customer base, or other relevant factors in this arena. It is the intention of the inventor to include this measure, or others that improve the predictive capabilities of the Tool, in future modifications to the preferred embodiment as they are they are developed.

Another alteration to the preferred embodiment that is under consideration would be the addition of a factor to measure opportunities to pursue vertical adjacencies, or opportunities for growth along the value chain. The current version of the invention focuses more on horizontal adjacencies, or expansions into related markets. Such additions would be made if they could be shown to refine the Tool's predictive abilities. As such, these should be viewed as enhancements to the preferred embodiment, rather than as new inventions.

What is claimed is:

1. A computer implemented method for quantitatively determining a strategic growth mix, the growth mix including a reenergize component, an adjacency component and a transformation component, the method comprising using said computer to perform the steps of:

storing company data of companies exhibiting successful growth;

defining from the stored company data, a model that quantifies respective amounts of reenergizing activities, adjacency activities and transformation activities for different strategic growth mixes, and the step of defining a model including, for each of the companies exhibiting a successful growth:

calculating respective quantitative values for determining factors indicative of business activities and market position of the companies;

(i) providing, for each determining factor, a respective changeably predetermined range of factor values and a changeably predefined weight for each of the reenergize component, adjacent component and transformation component, and (ii) selecting, for each determining factor, as a function of the calculated quantitative value for the determining factor and the predetermined ranges, one of the reenergize component, adjacency component and transformation component for associating with that factor;

summing, for each component, the respective weights of the component corresponding to each selection of the component across the different determining factors, such that a respective weighted sum is produced for each of the reenergize component, adjacency component and the transformation component, and determining, based on the weighted sums, relative percentage of the reenergize component, the adjacency component and the transformation component, the set of the determined relative percentages forming a model growth plan, such that plural different model growth plans are formed and define the model, and applying the model to a given company such that respective quantitative amounts of a reenergize component, an adjacency component and a transformation component are defined and form a strategic growth mix for the given company.

2. A method as claimed in claim 1 wherein the determining factors include any combination of:

market share to revenue ratio, asset to revenue ratio, change in profitability, responsiveness to market volatility, debt to equity ratio, credit worthiness, cash flow to revenue ratio, relative market share, change in market share, relative elasticity of demand, business mix, business age, number of divisions, number of SIC industries, R&D investment, acquisition strategy, strategic intent, asset growth, customer loyalty, qualitative measures of shifting value, and the identification of certain industries as having a bias toward a particular growth strategy.

3. A method as claimed in claim 1 further comprising the steps of:

collecting or estimating data regarding manpower, time and dollars spent by companies that have successfully implemented growth plans in the past;

applying the data to the formed strategic growth plan for the given company to provide general guidelines regarding manpower, time period and dollar investment to implement the strategic growth mix formed for the given company.

4. A calculation tool formed by the computer-implemented method of claim 1 for performing the steps of: obtaining company data of companies exhibiting successful growth; from the obtained company data, defining a model that quantifies respective amounts of reenergizing activities, adjacency activities and transformation activities for different strategic growth mixes; and applying the model to a given company such that respective quantitative amounts of a reenergize component, an adjacency component and a transformation component are defined and form a strategic growth mix for the given company, wherein the step of defining a model includes, for each of the companies exhibiting successful growth; from the obtained company data, calculating respective quantitative values for determining factors indicative of business activities and market position of the companies; for each determining factor, (i) providing a respective changeably predetermined range of factor values and a changeably predefined weight for each of the reenergize component, adjacency component and transformation component, and (ii) as a function of the calculated quantitative value for the determining factor and the predetermined ranges, selecting one of the reenergize component, adjacency component and transformation component for associating with that factor; for each component, summing the respective weights of the component corresponding to each selection of the component across the different determining factors, such that a respective weighted sum is produced for each of the reenergize component, adjacency component and the transformation component; and based on the weighted sums, determining relative percentage of the reenergize component, the adjacency component and the transformation component, the set of the determined relative percentages forming a model growth plan, such that plural different model growth plans are formed and define the model.

5. Apparatus for quantitatively determining a strategic growth mix, the growth mix including a reenergize component, an adjacency component and a transformation component, the apparatus comprising:

a memory serving as a source of and holding company data of multiple companies exhibiting successful growth;

a computer processor holding a model defined from the company data, the model quantifying respective percentages of reenergizing activities, adjacency activities and transformation activities for different strategic growth mixes, wherein the model defined a model including, for each of the companies exhibiting a successful growth:

calculating respective quantitative values for determining factors indicative of business activities and market position of the companies;

(i) providing, for each determining factor, a respective changeably predetermined range of factor values and a changeably predefined weight for each of the reenergize component, adjacent component and transformation component, and (ii) selecting, for each determining factor, as a function of the calculated quantitative value for the determining factor and the predetermined ranges, one of the reenergize component, adjacency component and transformation component for associating with that factor;

summing, for each component, the respective weights of the component corresponding to each selection of the component across the different determining factors, such that a respective weighted sum is produced for each of the reenergize component, adjacency component and the transformation component, and determining, based on the weighted sums, relative percentage of the reenergize component, the adjacency component and the transformation component, the set of the determined relative percentages forming a model growth plan; and repeating the foregoing steps for each of the multiple companies, such that plurality different model growth plans are formed and included in the model, and means for applying the model to a given company such that respective quantitative amounts of a reenergize component, an adjacency component and a transformation component are defined and form a strategic growth mix for the given company.

6. Apparatus as claimed in claim 5 wherein the determining factors include any combination of:

market share to revenue ratio, asset to revenue ratio, change in profitability, responsiveness to market volatility, debt to equity ratio, credit worthiness, cash flow to revenue ratio, relative market share, change in market share, relative elasticity of demand, business mix, business age, number of divisions, number of SIC industries, R&D investment, acquisition strategy and strategic intent.

7. Apparatus as claimed in claim 6 wherein credit worthiness is based on economic measurements, including a factor evaluating the absolute age of the company.

8. Apparatus as claimed in claim 5 wherein the means for applying further from collected or estimated company data on a set of companies that have previously implemented successful growth plans, provides general guidelines for manpower, time period and dollar investment to implement the growth plan formed for the given company.

9. Apparatus as claimed in claim 5 wherein the means for applying includes a questionnaire.

10. Apparatus as claimed in claim 5 wherein the model is formed of a set of electronic spreadsheets.

11. Apparatus as claimed in claim 10 wherein the means for applying is an interactive questionnaire.

\* \* \* \* \*